(12) United States Patent
Mori et al.

(10) Patent No.: US 7,730,875 B2
(45) Date of Patent: Jun. 8, 2010

(54) FLOW CONTROL VALVE

(75) Inventors: Katsumi Mori, Chiryu (JP); Hiroto Fujii, Kariya (JP); Nobuhiro Akashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/234,290

(22) Filed: Sep. 26, 2005

(65) Prior Publication Data

US 2006/0065870 A1 Mar. 30, 2006

(30) Foreign Application Priority Data

| Sep. 24, 2004 | (JP) | ............................. 2004-276313 |
| May 31, 2005 | (JP) | ............................. 2005-159255 |
| Aug. 24, 2005 | (JP) | ............................. 2005-241964 |

(51) Int. Cl.
*F02M 57/02* (2006.01)
*F16K 31/02* (2006.01)
(52) U.S. Cl. .............. 123/446; 251/129.07; 251/129.15
(58) Field of Classification Search ................. 137/504, 137/625.65, 565.01; 123/446; 251/129.07, 251/129.15
See application file for complete search history.

(56) References Cited

U.S. PATENT DOCUMENTS

| 2,833,602 | A | | 5/1958 | Bayer |
| 3,260,501 | A | | 7/1966 | Raymond |
| 3,799,199 | A | | 3/1974 | Rumpff |
| 4,051,864 | A | * | 10/1977 | Iwatsuki ...................... 137/504 |
| 5,377,720 | A | * | 1/1995 | Stobbs et al. .......... 137/625.65 |
| 5,676,169 | A | * | 10/1997 | Landrum .................... 137/106 |
| 5,918,635 | A | * | 7/1999 | Wang et al. ............. 137/625.65 |
| 6,446,606 | B1 | | 9/2002 | Krimmer et al. |
| 6,634,619 | B2 | * | 10/2003 | Cusac et al. ................. 251/368 |
| 6,669,166 | B2 | | 12/2003 | Enomoto et al. |
| 6,736,747 | B1 | * | 5/2004 | Stafford ....................... 475/116 |
| 6,840,223 | B2 | | 1/2005 | Fukuhara |
| 6,968,816 | B2 | | 11/2005 | Isobe et al. |
| 2002/0189589 | A1 | | 12/2002 | Kato et al. |
| 2003/0020038 | A1 | | 1/2003 | Miyamoto et al. |
| 2003/0089872 | A1 | | 5/2003 | Furuta et al. |
| 2003/0178006 | A1 | | 9/2003 | Fukuhara |

(Continued)

FOREIGN PATENT DOCUMENTS

DE 4206210 A1 9/1993

(Continued)

OTHER PUBLICATIONS

European Search Report—Mar. 8, 2006.

(Continued)

*Primary Examiner*—Stephen K Cronin
*Assistant Examiner*—J. Page Hufty
(74) *Attorney, Agent, or Firm*—Nixon & Vanderhye P.C.

(57) ABSTRACT

A spool valve is movably provided in a valve sliding space of a valve casing. The spool valve has a through-hole formed in the inside thereof, and a communication port formed in the spool valve is operatively communicated with a fluid port for controlling an opening area of the fluid port by moving within the valve sliding space. Multiple circular oil grooves are formed at an outer peripheral surface of the spool valve, into which high pressure fluid is supplied so that the spool valve can be smoothly moved in the valve sliding space.

6 Claims, 9 Drawing Sheets

U.S. PATENT DOCUMENTS

| | | |
|---|---|---|
| 2004/0194763 A1 | 10/2004 | Fukuhara |
| 2004/0197216 A1 | 10/2004 | Kuroda |
| 2004/0208753 A1 | 10/2004 | Mori |
| 2004/0261771 A1 | 12/2004 | Ichinose et al. |
| 2005/0081810 A1 | 4/2005 | Isobe et al. |

FOREIGN PATENT DOCUMENTS

| | | |
|---|---|---|
| DE | 19810330 | 9/1999 |
| EP | 1197692 A1 | 4/2002 |
| EP | 1 457 668 | 9/2004 |
| JP | S62-124383 | 8/1987 |
| JP | 63-147981 | 9/1988 |
| JP | 02-019975 | 2/1990 |
| JP | 02-107762 | 8/1990 |
| JP | H03-22181 | 3/1991 |
| JP | 04-039380 | 4/1992 |
| JP | 05-002217 | 1/1993 |
| JP | 07-224960 | 8/1995 |
| JP | 08-061542 | 3/1996 |
| JP | 2001-248521 | 9/2001 |
| JP | 2004-003666 | 1/2004 |
| WO | WO 97/00400 | 1/1997 |

OTHER PUBLICATIONS

EPO Search Report—Nov. 10, 2005.
Chinese Office Action dated May 25, 2007 issued in corresponding Chinese Application No. 200510106467.5 with English translation.
Extended European Search Report dated Oct. 1, 2007 issued in corresponding EP Application No. 07115042.9.
Chinese Official Action dated Nov. 9, 2007 issued in corresponding Chinese Application No. 2005101064675 with English translation.
Japanese Official Action dated Dec. 16, 2008 issued in corresponding Japanese Application No. 2004-276313, with English translation.
Japanese Official Action dated Jan. 6, 2009 issued in corresponding Japanese Application No. 2005-159255, with English translation.
Japanese Office Action dated Apr. 21, 2009, issued in corresponding Japanese Application No. 2005-159255, with English translation.
Japanese Office Action dated Dec. 15, 2009, issued in corresponding Japanese Application No. 2005-241964, with English translation.

* cited by examiner

FIG. 14A
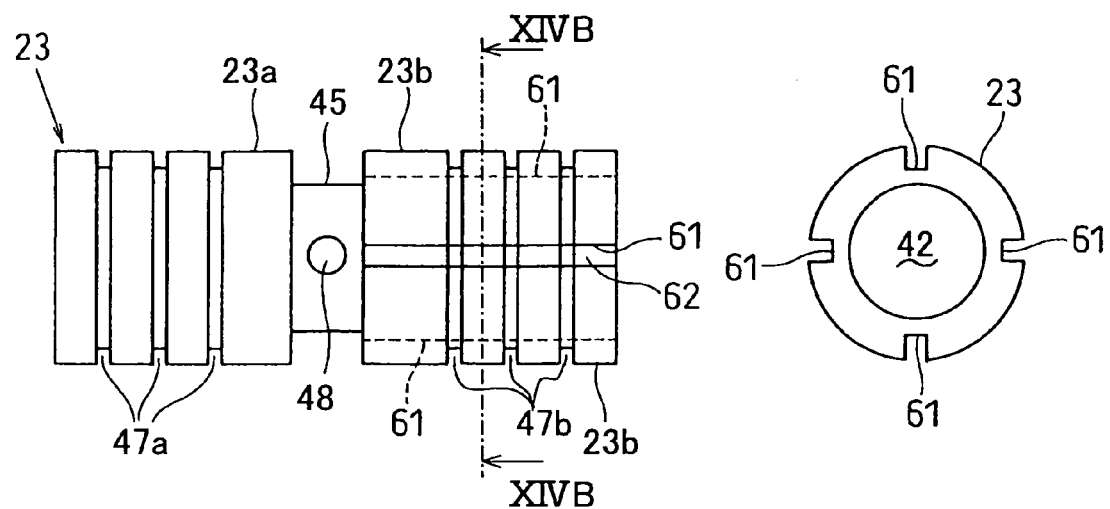
FIG. 14B
FIG. 15
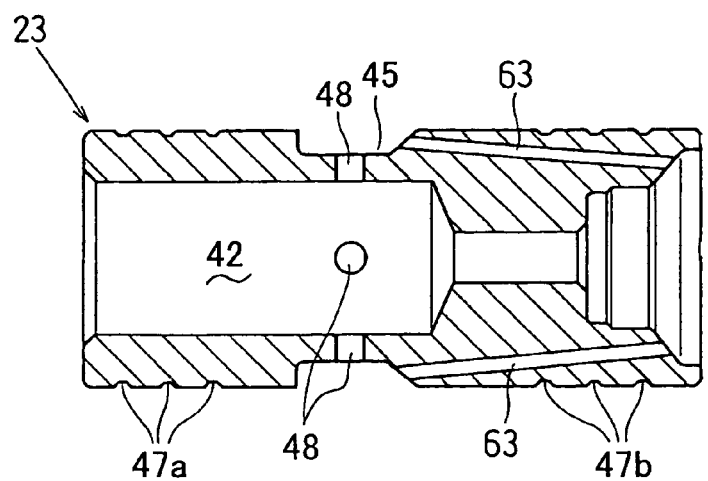

FLOW CONTROL VALVE

CROSS REFERENCE TO RELATED APPLICATION

This application is based on Japanese Patent Application Nos. 2004-276313 filed on Sep. 24, 2004, 2005-159255 filed on May 30, 2005 and 2005-241964 filed on Aug. 24, 2005, the disclosures of which are incorporated herein by reference.

FIELD OF THE INVENTION

The present invention relates to a flow control valve having a spool valve movably held in a valve sliding space of a valve casing for adjusting an opening area of a fluid passage of a fluid port in order to control flow amount of fluid, such as fuel, oil, or air and so on. More particularly, the present invention relates to a suction fuel amount adjusting valve, which is assembled in a fuel supply pump for a common rail fuel injection system, and which adjusts fuel amount flowing from a feed pump into a pressurizing chamber of the fuel supply pump.

BACKGROUND OF THE INVENTION

In a common rail fuel injection system conventionally known as a fuel injection system for a diesel engine, a high pressure fuel is accumulated in a common rail, and the high pressure fuel accumulated in the common rail is injected into combustion chambers of respective cylinders of the engine, through multiple injectors provided at the respective cylinders of the engine, at a predetermined timing. The high pressure fuel is supplied into the common rail from a fuel supply pump through a high pressure fuel pipe, wherein the fuel supply pump pressurizes fuel fed into a pressurizing chamber through an electromagnetic valve, because it is necessary to always accumulate in the common rail the high pressure fuel corresponding to a fuel injection pressure.

A fuel discharge amount discharged from the fuel supply pump is controlled by adjusting an opening area of a fuel suction passage communicating the feed pump with the pressurizing chamber through a suction valve, wherein fuel suction amount of the fuel flowing from the feed pump into the pressurizing chamber is adjusted by a pump driving current to a solenoid coil of the electromagnetic valve. An electromagnetic valve for the above purpose is proposed (for example, Japanese Patent Publication No. 2002-106740), in which an electromagnetic type suction fuel amount adjusting valve comprises; a spool valve having a function of a valve body for adjusting an opening area of fluid passage by moving in a valve sliding space and having a function of an armature for forming a magnetic circuit; and a valve casing having a function of a cylinder for movably accommodating the spool valve and having a function of a stator for forming the magnetic circuit.

In the electromagnetic type suction fuel amount adjusting valve disclosed in the above Japanese Patent publication, however, a centering of the spool valve in the valve sliding space of the valve casing can not be easily achieved due to a difference in a magnetic force, which is caused by a deviation of a clearance formed between an outer peripheral surface of a sliding portion of the spool valve and an inner surface of the valve sliding space of the valve casing. Then, the outer peripheral surface of the sliding portion of the spool valve is pressed against the inner surface of the valve sliding space of the valve casing, and thereby a lubricating performance is deteriorated between the outer peripheral surface of the sliding portion of the spool valve and the inner surface of the valve sliding space of the valve casing. As a result, the sliding portion of the spool valve may be stuck to the inner surface of the valve sliding space, and it may cause a problem of a decrease of durability. In the above method, in which the spool valve is moved relative to the fluid port of the valve casing to adjust the fuel flow amount, since the spool valve is slowly moved to control the opening area of the fluid passage of the fluid port, a sliding speed of the spool valve with respect to the fluid port of the valve casing is extremely low, it would become difficult to form an oil film between the outer peripheral surface of the sliding portion of the spool valve and the inner surface of the valve sliding space of the valve casing. The lubricating performance is thereby further deteriorated.

Accordingly, the sliding portion of the spool valve can not be smoothly moved with respect to the fluid port of the valve casing, when the pump driving current is applied to the solenoid coil of the electromagnetic type fuel suction amount adjusting valve and the armature of the spool valve is attracted toward an attracting portion of the stator of the valve casing. For example, an adjusting performance for fuel flow amount is deteriorated, as a result that response of the electromagnetic valve is deteriorated with respect to a pedal stroke of an acceleration pedal operated by a vehicle driver. Accordingly, a fuel suction amount of the fuel flowing from the feed pump into the pressurizing chamber may not quickly reach at a target amount, a time period during which the fuel amount discharged from the fuel supply pump reaches at a target amount would become longer, and a fuel pressure in the common rail can not quickly reach at a target fuel pressure as the vehicle driver desired. As a consequence, a delay of increasing an engine rotational speed may occur due to a delay of increase in the fuel injection amount, with respect to a change of the pedal stroke of the acceleration pedal operated by the vehicle driver. As above, a problem has occurred, in which an engine performance, such as an acceleration response and so on, is decreased.

In another prior art flow control valve for a common rail fuel injection system, for example, as discloses in Japanese (PCT) Patent Publication No. 2005-530568, the flow control valve adjusts an opening area of a fuel suction passage communicating a low pressure pump (a feed pump) with a high pressure pump (a supply pump), by controlling a magnetomotive force at a solenoid coil and thereby a relative position of a spool valve to a valve casing.

In the flow control valve disclosed in the above Japanese (PCT) Patent Publication, however, a lower side of an outer surface of the spool valve is always kept in contact with the valve casing due to gravity, and a partial wear may be caused because the spool valve is moved to slide in the valve casing with such a condition. Furthermore, a gap between the spool valve and the valve casing becomes smaller at a surrounding area of the contact portion between the spool valve and the valve casing, and thereby a larger magnetomotive force of the solenoid coil is applied to increase the contacting force, so that the partial wear is facilitated.

According to microscopic observation, streaked vestiges of wear are formed in the spool valve and the valve casing in a sliding direction of the spool valve, due to the wear. A contacting area is further increased between the spool valve and the valve casing, and frictional force is increased. This frictional force breaks a balance between the spring force and the magnetomotive force of the solenoid coil, to thereby cause a bad operation (a bad sliding movement) of the spool valve, to deteriorate controllability of fuel pressure in the common rail, and to cause a variation of fuel injection amount. Furthermore, it may increase harmful exhaust gas, deteriorate drivability, increase engine noise, and so on.

The electromagnetic valve disclosed in Japanese Patent Publication No. 2002-106740, as described above, comprises the valve casing having the valve sliding space straightly extending in the axial direction, and the cylindrical spool valve movable in the valve sliding space of the valve casing in the axial direction to control a communication condition between an outlet port and a communication port. A through-hole penetrates through an inside of the spool valve. A spring space is formed, to accommodate a spring, in the valve casing at one side of the spool valve in the axial direction for biasing the spool valve in its valve closing direction. The spring space is communicated with an inlet port of the valve casing through the through-hole.

In the above electromagnetic fuel suction amount control valve, however, fuel is supplied into the through-hole of the spool valve from the inlet port of the valve casing, and the fuel supplied into the outlet port of the valve casing through a flow amount adjusting groove. And the fuel in the spring space mostly stays in the spring space. When a foreign material flowing into the electromagnetic fuel suction amount control valve together with the fuel, or wear-out powder generated by sliding movement between a sliding surface of the spool valve and a sliding surface of the valve casing flows into the spring space, they stay in the spring space. Therefore, it may cause a problem that the foreign material or the wear-out powder may not easily flow out from the spring space.

A flow amount control portion is formed to control fuel flow amount by changing the opening area of the flow passage of the outlet port, when the spool valve is moved in its axial direction within the valve sliding space of the valve casing. For that purpose, a minimum gap, which is necessary in order that the spool valve is moved in its axial direction within the valve sliding space of the valve casing, is formed between the sliding surface of the spool valve and the sliding surface of the valve casing. Then, the foreign materials or the wear-out powder staying in the spring space may flow into the gap along with the axial movement of the spool valve, to break into the gap between the sliding surface of the spool valve and the sliding surface of the valve casing. A sliding resistance of the spool valve with respect to the sliding surface of the valve casing may be increased. As a result, a sliding performance of the spool valve is deteriorated and may cause a problem of a bad sliding movement of the spool valve. In the case that such bad sliding movement has occurred, a control characteristic of a pump discharge amount is deteriorated with respect to a value of a pump driving current to the solenoid coil of the flow control valve, and finally it may cause a problem of a decrease of an engine output.

SUMMARY OF THE INVENTION

The present invention is made in view of the above problems, and it is an object of the present invention to provide an electromagnetic valve, which increases durability, reliability, and response.

It is another object of the present invention to decrease wear of a spool valve and a valve casing of a flow control valve. It is a further object of the invention to provide a common rail fuel injection system, in which the increase of the harmful exhaust gas, the deterioration of the drivability, and the increase of the engine noise, etc. can be suppressed.

Furthermore, an object of the present invention is to provide a flow control valve, in which foreign materials having flown from an outside into an inside of the flow control valve or wear-out powder generated in the inside of the flow control valve may be actively exhausted to the outside along with the fluid, and thereby a problem to be caused by the foreign materials or the wear-out powder can be prevented.

According to a feature of the present invention, the present invention can be applied to a flow control valve which comprises;

a valve casing having a cylindrical body portion and a closed end portion, a valve sliding space being formed in the cylindrical body portion, one end of the valve sliding space forming a first fluid port and the other end of the valve sliding space being closed by the closed end portion, a second fluid port being formed in the cylindrical body portion and extending in a radial direction perpendicular to an axial line of the valve casing;

a spool valve movably supported in the valve sliding space of the valve casing and movable in an axial direction of the valve casing, a through-hole being formed in the spool valve for communicating both of first and second axial ends of the spool valve with each other, a first communication port being formed in the spool valve for communicating the through-hole with an outside of the spool valve, the first communication port being operatively communicated with the second fluid port of the valve casing when the spool valve is moved in the axial direction, and an outer surface of the spool valve being substantially fluid-tightly in a sliding contact with an inner surface of the valve sliding space of the valve casing;

a fluid space formed in the valve sliding space and defined by the closed end portion and the spool valve, the fluid space being communicated with the through-hole of the spool valve; and a spring disposed in the fluid space for biasing the spool valve in one direction.

In the above flow control valve; a first circular groove is formed at the outer surface of the spool valve communicated with the first communication port, so that the first communication port is operatively communicated with the second fluid port through the first circular groove, wherein an opening area of the second fluid port is changed depending on a relative position of the spool valve with respect to the valve casing in order that flow amount of the fluid flowing through the second fluid port is controlled; a first and second sliding surface portions are formed by the outer surface at both axial sides of the first circular groove; and multiple circular oil grooves are formed at the first and second sliding surface portions, wherein the fluid flows into the multiple circular oil grooves so that the spool valve is smoothly moved in the axial direction within the valve sliding space.

According to another feature of the present invention; a second circular groove is formed at the outer surface of the spool valve between the first circular groove and the second sliding surface portion of the spool valve; and a second communication port is formed in the spool valve for communicating the through-hole with the second circular groove, so that high pressure fluid is supplied from the through-hole to the second circular groove through the second communication port to carry out a centering of the spool valve within the valve sliding space.

According to a further feature of the present invention, a circular seal portion is formed on the outer surface of the spool valve between the first and second circular grooves, so that the first and second circular grooves are fluid tightly sealed from each other.

According to a still further feature of the present invention, a first longitudinal groove is formed on the first sliding surface portion, extending in the axial direction of the spool valve from the first axial end to the first circular oil groove, so that high pressure fluid flows into the first circular oil groove.

According to a still further feature of the present invention, a second longitudinal groove is formed on the second sliding surface portion, extending in the axial direction of the spool valve from the second axial end to the second circular oil groove, so that high pressure fluid flows into the second circular oil groove.

According to a still further feature of the present invention; a second circular groove is formed at the outer surface of the spool valve between the first circular groove and the second sliding surface portion of the spool valve; and a second longitudinal groove is formed on the second sliding surface portion, extending in the axial direction of the spool valve from the second axial end to the second circular groove, so that high pressure fluid flows from the fluid space into the second circular oil groove through the second longitudinal groove to carry out a centering of the spool valve within the valve sliding space.

According to a still further feature of the present invention, a center line of the second communication port is displaced from a radial line extending in a radial direction of the spool valve, when viewed on a plane perpendicular to the axial line of the spool valve, so that the spool valve is rotated within the valve sliding space when the high pressure fluid flows out of the through-hole into the second circular groove through the second communication port.

According to a still further feature of the present invention, a center line of the first communication port is displaced from a radial line extending in a radial direction of the spool valve, when viewed on a plane perpendicular to the axial line of the spool valve, so that the spool valve is rotated within the valve sliding space when the high pressure fluid flows out of the through-hole into the first circular groove through the first communication port.

According to a still further feature of the present invention, the flow control valve is used in a common rail fuel injection system for a diesel engine, which comprises; a common rail for accumulating high pressure fuel; a high pressure fuel pump for pressurizing the fuel and supplying the high pressure fuel into the common rail; and a low pressure pump for feeding the low pressure fuel to the high pressure pump, wherein the flow control valve is arranged in a fuel supply line for feeding the low pressure fuel from the low pressure pump to the high pressure pump, in order that the flow control valve controls flow amount of the fuel from the low pressure pump to the high pressure pump.

According to a still further feature of the present invention, the fuel pressure in the common rail is controlled in such a manner that the fuel pressure is controlled at a predetermined value in the case in which an operational condition of the engine meets a predetermined condition, wherein the predetermined value is higher than the fuel pressure in the other cases in which the operational condition of the engine does not meet the predetermined condition.

According to a still further feature of the present invention, the operational condition of the engine meets the predetermined condition, when an engine rotational speed is within a predetermined range, and a fuel injection amount is within a predetermined amount.

According to a still further feature of the present invention, a foreign material exhausting passage is formed in at least one of the spool valve and the valve casing, the foreign material exhausting passage extend from the fluid space to the second fluid port or to the first communication port, and the foreign material exhausting passage bypasses the through-hole.

BRIEF DESCRIPTION OF THE DRAWINGS

The above and other objects, features and advantages of the present invention will become more apparent from the following detailed description made with reference to the accompanying drawings. In the drawings:

FIG. 14A is a schematic top plan view showing a spool valve of the flow control valve of FIG. 13A;

FIG. 14B is a cross sectional view taken along a line XIVB-XIVB of FIG. 14A; and FIG. 15 is a cross sectional view of a spool valve according to a sixth embodiment of the present invention.

DETAILED DESCRIPTION OF THE PREFERRED EMBODIMENTS

The present invention will be explained below with reference to the embodiments.

First Embodiment

Figure 1:
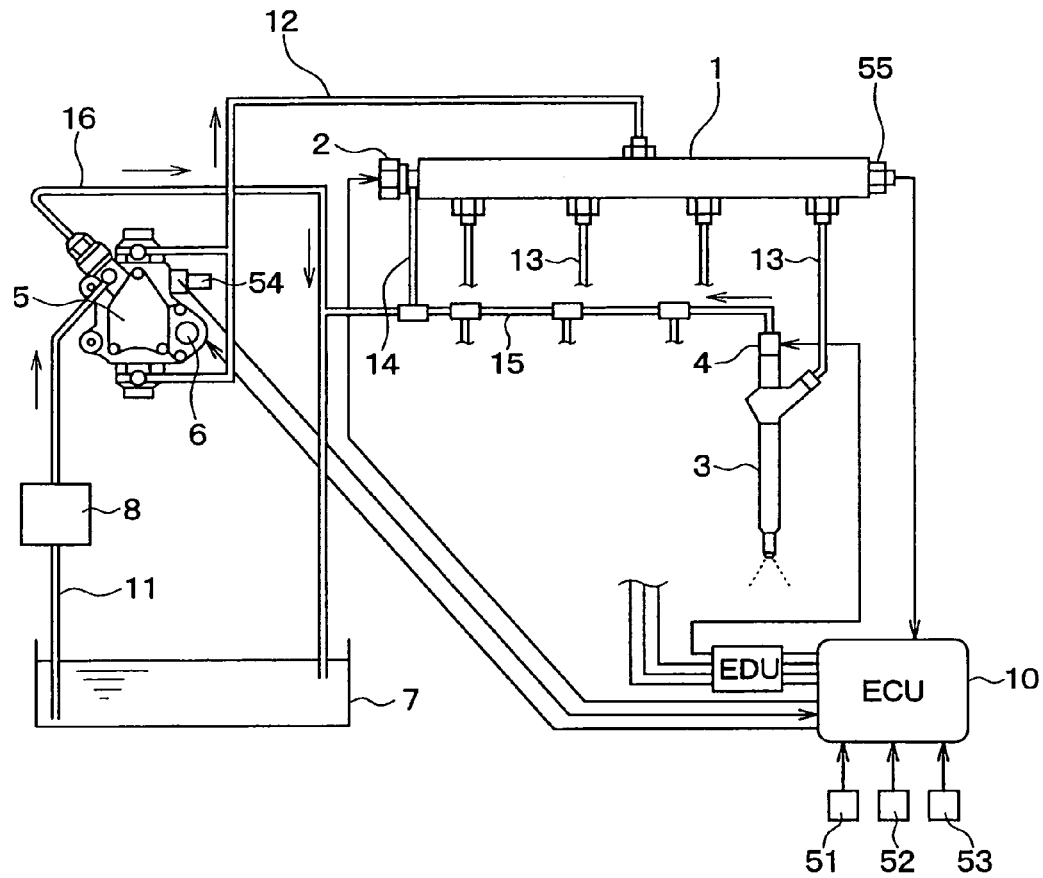
FIG. 1 is a schematic view showing a common rail fuel injection system, to which a flow control valve of the present invention is applied.
Figure 2:
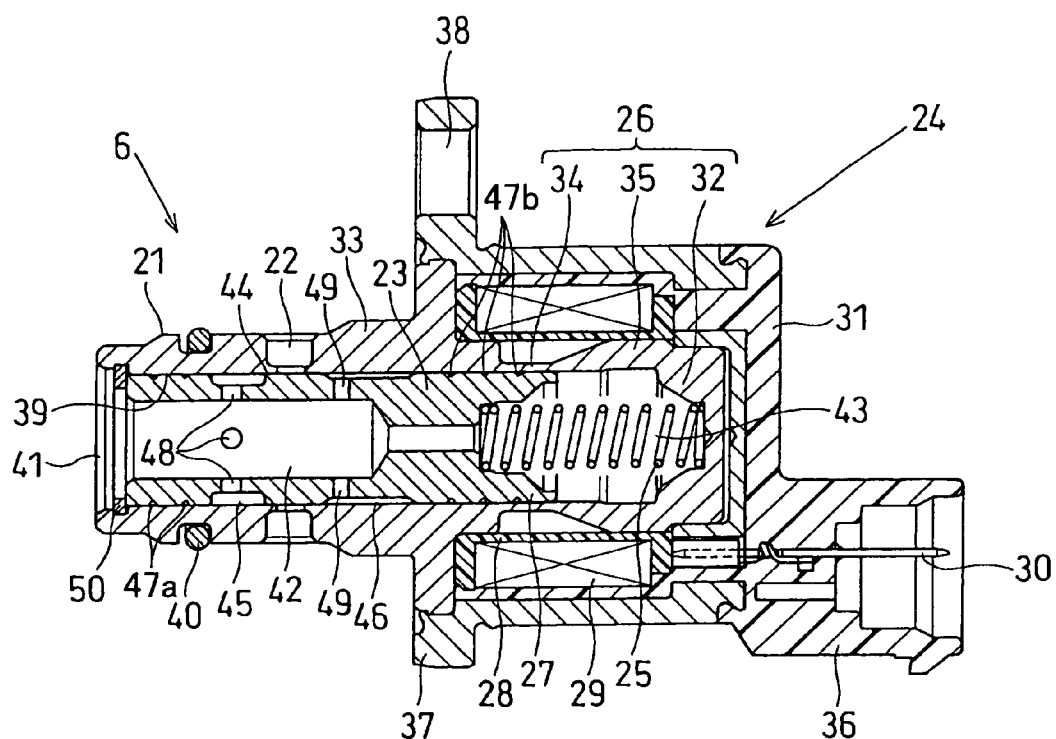
FIG. 2 is a cross sectional view of the flow control valve according to a first embodiment of the present invention.
Figure 3:
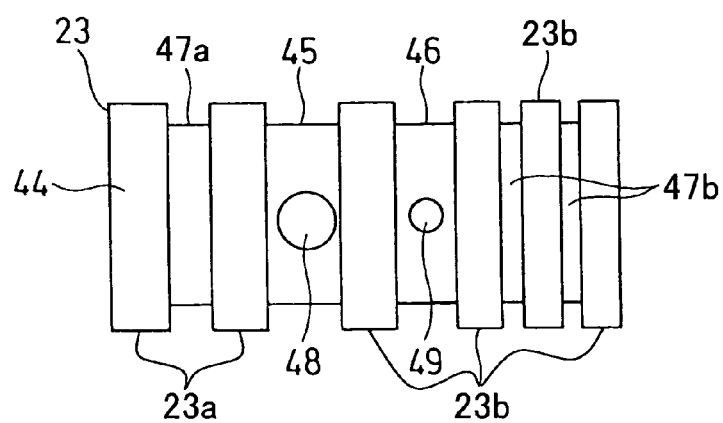
FIG. 3 is a schematic top plan view showing a spool valve of the flow control valve of FIG. 2.

FIGS. 1 to 3 show a first embodiment of the present invention, wherein FIG. 1 is a view showing an entire structure of a common rail fuel injection system, FIG. 2 is a view showing an electromagnetic valve, and FIG. 3 is a view showing a spool valve of the electromagnetic valve for a supply pump.

A fuel injection apparatus for an internal combustion engine according to the embodiment is installed in a vehicle, such as an automotive vehicle. The fuel injection apparatus is, for example, a common rail fuel injection system (a fuel accumulated type injection apparatus) known as a fuel injection system for an internal combustion engine, such as a diesel engine (a multi cylinder diesel engine, hereinafter referred to as an engine). In the fuel injection apparatus, high pressure fuel accumulated in a common rail 1 is injected into combustion chambers of respective cylinders of the engine via multiple (four in this embodiment) electromagnetic fuel injection valves (injectors) 3 provided at respective engine cylinders.

The common rail fuel injection system comprises a common rail 1 for accumulating high pressure fuel, the pressure of which corresponds to a fuel injection pressure, multiple injectors 3 for injecting fuel into combustion chambers of the respective engine cylinders at a predetermined timing, a fuel supply pump (a high pressure pump) 5 of a fuel suction amount adjusting type for pressurizing fuel fed into a pressurizing chamber through an electromagnetic flow control valve 6 (SCV: hereinafter referred to as an electromagnetic valve), and an engine control unit (hereinafter referred to as ECU) 10 for electronically controlling multiple electromagnetic valves 4 of the injectors 3 as well as the electromagnetic valve 6 of the supply pump 5. In FIG. 1, only one injector 3 for one of cylinders of a four cylinder engine is shown, whereas the injectors for the other cylinders are omitted. An output shaft (for example, a crank shaft) of the engine drives a drive shaft or a cam shaft of the supply pump 5 via a belt.

The common rail 1 is connected with a discharge port of the supply pump 5 for discharging the high pressure fuel, through a fuel supply pipe 12. A depressurizing valve 2 of a normally-closed type is provided at a pressure relief pipe 14 from the common rail 1 to a fuel tank 7, wherein the valve 2 adjusts an opening degree of a fuel return passage communicated to the fuel tank 7. The depressurizing valve 2 is an electromagnetic valve, which has a superior pressure decreasing performance for quickly decreasing the fuel pressure (the common rail pressure) in the common rail 1 from its high pressure to a low pressure, by electronically controlling with a pressure decreasing driving current supplied from the ECU 10 through a pressure decreasing driving circuit, when a vehicle speed is reduced or an engine operation is stopped.

The depressurizing valve 2 comprises a valve body (not shown) for adjusting the opening degree of the fuel return passage for returning the fuel from the common rail 1 to the fuel tank 7, a solenoid coil (not shown) for driving the valve body in a valve opening direction, and a valve biasing means (not shown), such as a spring, for biasing the valve body in a valve closing direction. The depressurizing valve 2 adjusts fuel return amount of the fuel returning from the common rail 1 to the fuel tank 7 through the pressure relief pipe 14, in proportion to a value of the pressure decreasing driving current to be applied to the solenoid through the pressure decreasing driving circuit, to change the fuel pressure (the common rail pressure) in the common rail 1. A pressure limiter can be provided, instead of the depressurizing valve 2, to the pressure relief pipe 14, wherein the pressure limiter controls the fuel pressure in the common rail 1 below a predetermined pressure limit, by opening its valve when the fuel pressure in the common rail 1 exceeds the predetermined pressure limit.

The multiple injectors 3 provided at the respective engine cylinders are connected to downstream ends of multiple branched pipes 13 branched off from the common rail 1. The injector 3 comprises a fuel injection nozzle for carrying out a fuel injection into the combustion chambers of the respective engine cylinders, the electromagnetic valve 4 for driving a nozzle needle (not shown) accommodated in the fuel injection nozzle in a valve opening direction, a needle biasing means, such as a spring, for biasing the nozzle needle in a valve closing direction, and so on. The fuel injection for the combustion chambers of the respective cylinders carried out by the injectors 3 of the respective cylinders is electronically controlled by supply and non-supply of electric current (ON/OFF) to the solenoid coil (not shown) of the electromagnetic valve 4, which controls an increase and a decrease of fuel pressure in a back pressure chamber for controlling an operation of a command piston moved together with the nozzle needle. Namely, the high pressure fuel accumulated in the common rail 1 is injected into the combustion chambers of the respective engine cylinders, during a time period in which the electric current is supplied to the solenoid coil of the electromagnetic valve 4 of the injector 3 and thereby multiple injection ports formed at a forward end of the nozzle body are opened by the nozzle needle. The engine is thereby operated. A leak port is provided at the injector 3 for leaking a surplus fuel or the fuel discharged from the back pressure chamber to a low pressure side of the fuel system. Therefore, the leaked fuel from the injectors 3 returns to the fuel tank 7 via a fuel return pipe 15.

The supply pump 5 is a high pressure fuel supply pump, which comprises two (or more than two) pressurizing systems for pressurizing the low pressure fuel fed into the pump, namely two cylinders (or more than two cylinders) for pump elements, wherein one electromagnetic valve 6 controls the fuel discharge amount from the two (or more than two) pressurizing systems by adjusting the fuel suction amount of the fuel fed into respective pressurizing chambers. The supply pump 5 comprises a well known feed pump (a low pressure fuel supply pump: not shown) for drawing low pressure fuel from the fuel tank 7 when a pump driving shaft (a drive shaft or a cam shaft) is rotated by a rotation of the crankshaft of the engine, a cam (not shown) driven to rotate by the pump driving shaft, two (or more than two) plungers (not shown) reciprocating between a top dead center and a bottom dead center when it is driven by the cam, two (or more than two) pressurizing chambers (plunger chambers: not shown) for pressurizing the fuel flowing thereinto to a high pressure when the plungers are reciprocated in a cylinder head (not shown) provided in a pump housing, two (or more than two) suction valves (not shown) which are closed when the fuel pressure in the respective pressurizing chambers exceeds a predetermined value, and two (or more than two) discharge valves (not shown) which are opened when the fuel pressure in the respective pressurizing chambers exceeds a predetermined value.

Accordingly, the supply pump 5 pressurizes the low pressure fuel drawn from the fuel tank 7 into the two pressurizing chambers through a fuel supply pipe 11, by reciprocating the respective plungers in the cylinder head (the pump cylinder). A fuel filter 8 is provided in the fuel supply pipe 11. Each of the two suction valves comprises a check valve provided at an upstream side of the respective pressurizing chambers, namely in fuel suction passage lines from the feed pump to the two pressurizing chambers through the single electromagnetic valve 6. Each of the two discharge valves comprises a check valve provided at a downstream side of the respective pressurizing chambers, namely in fuel discharge passage lines from the pressurizing chambers to the discharge port. A leak port is provided at the supply pump 5 in order that the fuel temperature inside of the pump may not become to high temperature, and the leaked fuel from the supply pump 5 returns to the fuel tank 7 through a fuel return pipe 16.

The electromagnetic valve 6 is provided in the fuel suction passage lines (not shown) formed in the supply pump 5 communicating the feed pump with two pressurizing chambers through the two check valves, for adjusting the fuel suction amount of the fuel fed into the pressurizing chambers. The electromagnetic valve 6 comprises, as shown in FIG. 2, a valve casing 21 of a sleeve shape fixed to the pump housing, a valve body (hereinafter referred to as a spool valve) 23 for controlling an opening area of a fuel passage of an outlet port (a fluid port) 22 formed in the valve casing 21 and opening in a radial direction, a linear solenoid actuator 24 for driving the spool valve 23 in a valve opening direction, and a return spring 25 for biasing the spool valve 23 in a valve closing direction.

The electromagnetic valve 6 is an electromagnetic flow control valve of a normally closed type for adjusting the fuel suction amount of the fuel fed into the pressurizing chambers of the supply pump 5, when the electromagnetic valve is electronically controlled by a pump driving current applied from the ECU 10 through a pump driving circuit (not shown). Namely, the electromagnetic valve 6 controls the opening area of the fuel passage of the outlet port 22 formed in the valve casing 21 by moving the spool valve 23 in its stroke direction (an axial direction), in proportion to a value of the pump driving current to be applied to the linear solenoid actuator 24 through the pump driving circuit. Accordingly, the fuel suction amount of the fuel fed from the feed pump into the pressurizing chambers through the fuel passage lines and the suction valves is controlled. As a result, the fuel discharge amount of the fuel discharged from the pressurizing chambers of the supply pump 5 to the common rail 1 is controlled at a most appropriate value corresponding to an operational condition of the engine (for example, the engine rotational speed, the pedal stroke of the acceleration pedal, the command fuel injection amount, etc.), and the fuel pressure in the common rail 1, namely the common rail pressure, corresponding to the injection pressure of the fuel to be injected from the injectors 3 into the combustion chambers of the respective engine cylinders is changed.

The linear solenoid actuator 24 comprises a stator portion (a stator core) 26 of a cylindrical sack shape integrally formed with and at a right hand side (in the drawing) of the valve casing 21, an armature portion (an armature or a moving core) 27 integrally formed with and at a right hand side (in the drawing) of the spool valve 23, a coil bobbin 28 made of resin and arranged at an outer periphery of a cylindrical portion of the stator portion 26, a solenoid coil 29 wound on an outer periphery of the coil bobbin 28, a terminal 30 electrically connected to lead wires (not shown) of the solenoid coil 29, a cylindrical housing 31 covering an outer peripheral portion of the solenoid coil 29, and so on. The stator portion 26 of the valve casing 21 operates as an electromagnet when electric current is supplied to the solenoid coil 29, and forms as an attracting portion (a closed end portion) 32 for attracting the armature portion 27 of the spool valve 23. The attracting portion 32 is connected to an accommodating portion (a cylindrical body portion) 33, which movably accommodates the spool valve 23, via a thin-walled portion 34 and a cylindrical wall portion 35.

The solenoid coil 29 is a coil, in which electrically conductive wires covered with insulating film are wound by multiple turns, and which generates a magnetomotive force when the electric current is supplied thereto, to attract the armature portion 27 in its stroke direction (in the axial direction) by magnetizing the stator portion 26 of the valve casing 21 and the armature portion 27 of the spool valve 23. The solenoid coil 29 comprises a coil portion wound between a pair of flanged portions of the coil bobbin 28, and a pair of lead wires (terminal wires) drawn out of the coil portion. The housing 31 is integrally formed from resin material having a high insulation performance, and comprises a cylindrical portion covering the outer peripheral portion of the solenoid coil 29 and a cylindrical connector portion 36 for holding the terminal 30. A cylindrical bracket 37 is provided at an outer periphery of the housing 31, wherein the bracket 37 is fixed to a circular flange portion formed at the outer periphery of the valve casing 21 by means of caulking. A circular flange portion formed at an outer periphery of the bracket 37 is fixed to an outer surface of the pump housing of the supply pump 5 with a fixing means (not shown), such as screws. An insertion hole 38 is formed in the flange portion for inserting the fixing means therethrough.

The valve casing 21 of the electromagnetic valve 6 has a function of a cylinder (the accommodating portion 33) for movably accommodating the spool valve 23, and a function of a stator (the stator portion 26) for forming the magnetic circuit. The valve casing 21 is made of soft magnetic material, such as ferritic stainless steel (SUS13), in order that the valve casing 21 performs the function of the stator. The soft magnetic material can not be heat-treated, such as a heat treatment of hardening, because a magnetic property may be deteriorated. It is required, however, to improve wear resistance and surface hardness, in order that the valve casing performs its function of the cylinder as its original function. Therefore, a hardening coating of nickel-phosphor plating is formed on an inner surface of a spool space (a valve sliding space) 39 of the valve casing 21. A cylindrical guiding portion is formed at the inner surface of the spool space 39 of the valve casing 21, to guide (attract) the spool valve 23 in the axial direction (the stroke direction).

A left hand portion (in the drawing) of the valve casing 21 is press fitted into a recess (not shown) formed at an outer surface of the pump housing of the supply pump 5, and a sealing element 40, such as an O ring, is provided between an inner surface of the recess of the pump housing and the outer periphery of the valve casing 21, to prevent the fuel from leaking. An inlet port (a first fluid port) 41 is formed at the left hand portion (in the drawing) of the valve casing 21, wherein the inlet port 41 is communicated with a fuel pooling portion (not shown) into which the fuel is fed from the feed pump. Four outlet ports (second fluid ports) 22 are formed, which are connected to latter halves of the fuel suction passage lines communicated with the two pressurizing chambers through the two suction valves. A fuel passage diameter at an inlet side of the outlet ports 22 is made smaller than that at an outlet side. The valve casing 21 has the spool space (the valve sliding space) 39, in which the spool valve 23 is to slide. An inner flow passage (a first inner flow passage: a fluid space) 43 is formed in the right hand portion (in the drawing) of the spool space 39, wherein the first inner flow passage 43 is communicated with the inlet port 41 through an inner flow passage (a second inner flow passage: a through-hole) 42 formed in the inside of the spool valve 23. The inner flow passage 43 also functions as a spring space for accommodating the return spring 25.

The spool valve 23 of the electromagnetic valve 6 is a spool type valve of a sleeve shape having the inner flow passage (the through-hole) 42 in the longitudinal (axial) direction in the inside thereof. The spool valve 23 has sliding portions 44 at its outer periphery, which are in contact with the inner surface of the spool space 39 in a sliding manner. The spool valve 23 controls the opening area of the fuel passage at the outlet ports 22 of the valve casing 21, so that the fuel flow amount (fuel suction amount) of the fuel fed into the two pressurizing chambers through the two suction valves is controlled. The spool valve 23 has a function of a valve, as an original function of the valve body, for changing the opening area of the fuel passage at the outlet ports 22 with the sliding movement in the spool space 39 of the valve casing 21, and also has a function of an armature (the armature portion 27) for forming the magnetic circuit. The spool valve 23 is made of soft magnetic material, such as pure iron or low carbon steel, in order that the spool valve 23 performs the function of the armature. The soft magnetic material can not be heat-treated, such as a heat treatment of hardening, because a magnetic property may be deteriorated. It is required, however, to improve wear resistance and surface hardness, in order that the spool valve 23 performs its function of the valve. Therefore, a hardening coating of nickel-phosphor plating is formed at the outer surface of the sliding portion 44 of the spool valve 23.

An initial position of the spool valve 23 is defined by a ring shaped stopper 50 press inserted into an inner surface of a left hand portion (in the drawing) of the valve casing 21. And the spool valve 23 is always biased by the return spring 25 provided in the inner flow passage 43. Accordingly, the spool valve 23 is limited in its sliding movement of the valve closing direction of the spool valve 23, at a position of the stopper 50 at which a forward (left-hand) end is brought into contact. The cylindrical armature portion 27 is integrally formed at the right hand end (in the drawing) of the spool valve 23, wherein the armature portion 27 opposes to the stator portion 26 of the valve casing 21 with a predetermined gap. The inner flow passage (the through-hole) 42 is formed in the inside of the spool valve 23, so that the inlet port 41 of the valve casing 21 is communicated with the inner flow passage (the fluid space) 43. An inner diameter of the right hand portion of the inner flow passage 42 is made smaller than that of the left hand portion. The spool valve 23 is easily moved by allowing the fuel to flow into or to flow out of the inner flow passage 43, when the spool valve 23 is moved in the longitudinal direction.

A circular flow amount adjusting groove 45 (a circular flow passage: a first circular groove), a circular centering groove 46 (a second circular groove), and multiple (two or three) circular oil grooves 47a, 47b are formed at an outer peripheral surface of the sliding portion 44 of the spool valve 23. The sliding portion 44 comprises multiple sliding surface portions (first sliding surface portions 23a and second sliding surface portions 23b). The flow amount adjusting groove 45 is positioned between neighboring first and second sliding surface portions 23a, 23b, and is formed by making an outer diameter of the spool valve 23 smaller than that of the sliding portion 44. The flow amount adjusting groove 45 is formed in a circumferential direction at the sliding portion 44, and is communicated with the inner flow passage (the through-hole) 42 through first communication ports 48, a flow passage diameter of which is smaller than that of the flow amount adjusting groove 45. Four communication ports 48 are opened to the flow amount adjusting groove 45. The centering groove 46 is positioned between the neighboring second sliding surface portions 23b, and is formed by making the outer diameter of the spool valve 23 smaller that that of the sliding portion 44. The centering groove 46 is shallower than the flow amount adjusting groove 45, and is formed in the circumferential direction of the sliding portion 44 as being longer in the longitudinal direction than the flow amount adjusting groove 45 (See FIG. 2). The centering groove 46 is communicated with the inner flow passage (the through-hole) 42 through a second communication port 49, a flow passage diameter of which is smaller than that of the centering groove 46. Two communication ports 49 are opened to the centering groove 46.

The multiple oil grooves 47a and 47b are circumferential grooves for forming oil films between the inner surface of the spool space 39 of the valve casing 21 and the outer surface of the sliding portion 44 of the spool valve 23, wherein fuel flows into the grooves 47a and 47b from a gap between the spool space 39 of the valve casing 21 and the left hand portion in the drawing (forward end) or the right hand portion in the drawing (backward end) of the spool valve 23. With respect to the sliding portions 44 of the spool valve 23 according to the present embodiment, a sealing portion is formed between the outer surface of the spool valve 23 (the sliding surface portion 23a of the right-hand side, and the sliding surface portion 23b of the left-hand side) and the inner surface of the spool space 39 of the valve casing 21, so that the flow amount adjusting groove 45 is liquid tightly sealed from the centering groove 46. Furthermore, with respect to the sliding portions 44 of the spool valve 23, a predetermined clearance, which is necessary for the spool valve 23 to slide in the spool space 39 of the valve casing 21, is formed between the outer surface of the multiple first and second sliding surface portions 23a and 23b and the inner surface of the spool space 39 of the valve casing 21.

The ECU 10 is formed as a micro computer of a well known structure, which comprises CPU for performing a control process and calculation process, a memory device (memories, such as ROM, RAM etc.) for storing various programs and data, an input circuit, an output circuit, a battery circuit, an injector driving circuit (EDU), a pump driving circuit, a depressurizing valve driving circuit, and so on. Sensor signals from various sensors are inputted into the micro computer after they are converted from analog to digital signals by A/D converters. The ECU 10 is further formed, as shown in FIG. 1, so that a voltage signal from a fuel pressure sensor (a fuel pressure detecting means) 55 and sensor signals from the other various sensors are inputted into the micro computer of the ECU 10, after they are converted from analog to digital signals by A/D converters.

The ECU 10 is formed in such a manner that the ECU electronically controls, for example, the electromagnetic valves 4 of the injectors 3 and the electromagnetic valve 6 of the supply pump 5, based on the control program or a control logic stored in the memory device, when an engine key is returned to an IG position and an ignition switch (not shown) is turned on (IG·ON) after the engine is cranked up. Connected to the micro computer are a crank angle sensor 51 for detecting a rotational angle of an engine crank shaft, an acceleration sensor 52 for detecting an opening degree of an acceleration pedal (ACCP), an engine cooling water sensor 53 for detecting temperature of engine cooling water (THW), a fuel temperature sensor 54 for detecting temperature of the fuel (THF) on a pump suction side flowing into the supply pump 5, and so on. The ECU 10 operates as a rotational speed detecting means for detecting the engine rotational speed (NE) by measuring interval times of NE signal pulses outputted from the crank angle sensor 51.

Operation of the First Embodiment

An operation of the supply pump 5 of the embodiment is explained with reference to FIG. 1 to FIG. 3.

When the pump driving shaft (the drive shaft or cam shaft) of the supply pump 5 is driven to rotate by the crankshaft of the engine via the belt, two plungers reciprocate on the sliding surfaces of the cylinder head. When one of the plungers, for example, positioned at the top dead center is moved down, the pressure in the pressurizing chamber is decreased to open the suction valve, so that the fuel is fed into the pressurizing chamber from the feed pump through the fuel pooling portion, the inlet port 41 of the electromagnetic valve 6, the inner flow passage 42, the first communication ports 48, the flow amount adjusting groove 45, the outlet ports 22, the fuel passage line and the suction valve. When the plunger is upwardly moved again after having reached at the bottom dead center, the pressure in the pressurizing chamber is increased, the suction valve is closed, and the pressure in the pressurizing chamber is further increased. When the pressure in the pressurizing chamber exceeds the valve opening value of the discharge valve, the discharge valve is opened, so that the high pressure fuel is supplied from the pressurizing chamber to the common rail 1 through the fuel supply pipe 12.

The fuel in the other pressurizing chamber is likewise supplied to the common rail 1 through the discharge valve and the fuel supply pipe 12, since the other plunger is reciprocated between the top dead center and the bottom dead center as in the same manner to the above plunger. As above, the supply pump 5 is so arranged that a cycle of the suction stroke and discharge stroke is carried out twice for each rotation of the pump driving shaft. The high pressure fuel accumulated in the common rail 1 can be injected into the combustion chambers of the respective engine cylinders at a predetermined timing, by driving the electromagnetic valve 4 of the injector 3 at desired fuel injection timing.

The discharge amount of the fuel discharge from the supply pump 5 to the common rail 1 through the discharge valve and the fuel supply pipe 12 is controlled in such a manner that the pump driving current to be applied to the solenoid coil 29 of the electromagnetic valve 6 is controlled by the ECU 10, a stroke amount of the spool valve 23 of the electromagnetic valve 6, namely the opening area of the fuel passage of the fuel suction passage line, in particular, the opening area of the fuel passage of the outlet ports 22 is thereby controlled, and finally the suction amount of the fuel fed from the feed pump into the pressurizing chamber through the suction valve is controlled.

Namely, the suction amount of the fuel fed into the two pressurizing chambers is controlled in proportion to the value of the pump driving current to be applied to the solenoid coil 29 through the pump driving circuit, as a result the ECU 10 electronically controls the electromagnetic valve 6 by a pump driving signal in accordance with the engine rotational speed (NE), the acceleration opening degree (ACCP), the command fuel injection amount (Q), and so on. Accordingly, it becomes possible to control the common rail pressure as the vehicle driver demands (for example, the pedal stroke: the acceleration opening degree), by changing the discharge amount of the fuel discharged from the pressurizing chambers, wherein the common rail pressure corresponds to the injection pressure of the fuel to be injected into the combustion chambers of the respective engine cylinders through the injection ports of the injectors mounted to the respective engine cylinders.

Effects of the First Embodiment

As explained above, according to the supply pump 5 of this embodiment, the circular flow amount adjusting groove (the first circular groove) 45 for controlling the suction amount of the fuel, the circular centering groove (the second circular groove) 46 for centering (the oil pressure centering) the sliding portion 44 of the spool valve 23 within the spool space (the valve sliding space) 39 of the valve casing 21, and the multiple circular oil grooves 47a and 47b for forming the oil film between the spool space 39 of the valve casing 21 and the sliding portion 44 of the spool valve 23 are formed at the outer peripheral surface of the sliding portion 44 of the spool valve 23. Furthermore, the inner flow passage (the through-hole) 42 is communicated with flow amount adjusting groove 45 through the first communication port 48, and the inner flow passage 42 is communicated with the centering groove 46 through the second communication port 49. And the fuel flowing from the feed pump into the inner flow passages 42 and 43 through the fuel pooling portion and the inlet port (the first fluid port) 41 is supplied to the centering groove 46 through the second communication port 49, and furthermore supplied to the multiple circular oil grooves 47b through the gap formed between the spool space 39 of the valve casing 21 and the sliding portion 44 of the spool valve 23.

Accordingly, the oil pressure centering (the fluid pressure centering) of the spool valve 23 is carried out within the spool space 39 of the valve casing 21, by supplying the fuel into the gap between the inner surface of the spool space 39 of the valve casing 21 and the outer peripheral surface of the sliding portion 44 of the spool valve 23. As a result, the spool valve 23 can be smoothly moved in the stroke direction within the spool space 39 of the valve casing 21, when the electric current is supplied to the solenoid coil 29, and thereby the reliability as well as the response can be enhanced. Namely, the engine performance of the acceleration response and so on can be stabilized, because the control response of the spool 23 of the electromagnetic valve 6 is improved.

Furthermore, the fuel is supplied into the gap between the inner surface of the spool space 39 of the valve casing 21 and the outer peripheral surface of the sliding portion 44 of the spool valve 23, so that the oil film is formed between the inner surface of the spool space 39 of the valve casing 21 and the outer peripheral surface of the sliding portion 44 of the spool valve 23. The lubrication performance is thereby increased, and the durability of the electromagnetic valve 6 is likewise increased, because the sliding portion 44 of the spool valve 23 can be prevented from sticking to the spool space. Furthermore, according to the present embodiment, the centering groove 46 for centering the sliding portion 44 of the spool valve 23 is formed in the sliding portion 44 of the spool valve 23, namely between the neighboring sliding surface portions 23b. The workability and productivity can be improved, when compared with a case in which the centering groove is formed in the inner surface of the spool space 39 of the valve casing 21, because the centering groove 46 can be formed by an outside cutting process or a groove cutting process at the sliding portion 44 of the spool valve 23.

Second Embodiment

Figure 4:
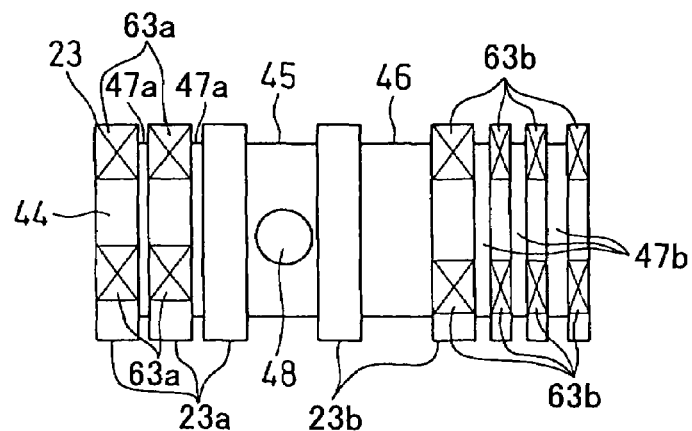
FIG. 4 is a schematic top plan view showing a spool valve of the flow control valve according to a second embodiment of the present invention.

FIG. 4 shows a second embodiment of the present invention, and is a view showing a spool valve 23 of the electromagnetic valve 6 of the supply pump.

According to the supply pump 5 of this embodiment, as in the same manner to the first embodiment, the circular flow amount adjusting groove 45, the circular centering groove 46 and multiple circular oil grooves 47a and 47b are formed at the sliding portion 44 of the spool valve 23 for controlling the suction amount of the fuel with sliding movement of the spool valve in the spool space 39 of the valve casing 21 of the electromagnetic valve 6. According to the embodiment, the first communication port 48 for communicating the inner flow passage (the through-hole) 42 with the flow amount adjusting groove 45 is formed, whereas the second communication port 49 for communicating the inner flow passage (the through-hole) 42 with the centering groove 46 is not formed. Instead of the second communication port 49, multiple communicating grooves 63b are formed at outer peripheries of the second sliding surface portions 23b, so that the fuel is supplied to the centering groove 46 as well as the multiple circular oil grooves 47b from the inlet port 41 of the valve casing 21 or from the inner flow passage (the fluid space) 43 through the gap between the inner surface of the spool space 39 and the outer peripheral surface of the sliding portion 44 of the spool valve 23.

The communicating grooves 63b of more than 4 grooves are formed at the outer peripheries of the second sliding surface portions 23b at equal intervals, for example by the outside cutting process. In this case, as in the same manner to the first embodiment, the durability of the electromagnetic valve 6 can be likewise increased, because the lubrication performance is increased and the sliding portion of the spool valve 23 is prevented from sticking to the spool space. Furthermore, the reliability as well as the response of the electromagnetic valve 6 can be increased, since the centering of the spool valve 23 in the spool space 39 can be realized and thereby the spool valve 23 can be smoothly moved in its stroke direction in the spool space 39 when the electric current is supplied to the solenoid coil 29.

Third Embodiment

Figure 5A:
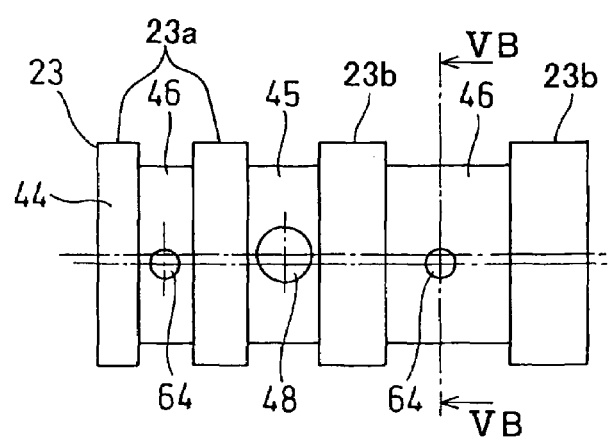
FIG. 5A is a schematic top plan view showing a spool valve of the flow control valve according to a third embodiment of the present invention.
Figure 5B:
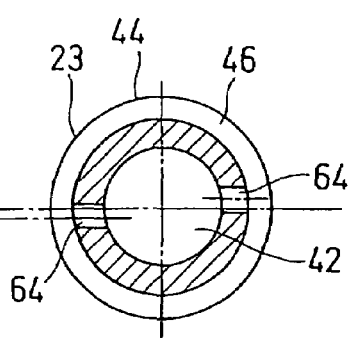
FIG. 5B is a cross sectional view taken along a line VB-VB of FIG. 5A.

FIGS. 5A and 5B show a third embodiment of the present invention, and views showing a spool valve 23 of the electromagnetic valve of the supply pump.

According to the embodiment, communication ports 64, which communicate two centering grooves 46 respectively formed between the first and second sliding surface portions 23a and 23b of the sliding portion 44 with the inner flow passage (the through-hole) 42, are formed in the spool valve 23 to penetrate the sleeve portion thereof from its inner surface to its outer surface and formed at such positions eccentric to a perpendicular line of a center line for the spool valve 23. Namely, a center line of the respective second communication ports 64 is displaced from a radial line extending in a radial direction of the spool valve 23, when viewed on a plane perpendicular to the axial line of the spool valve 23.

With such an arrangement, the spool valve 23 will be rotated in the spool space 39 with respect to its center line, due to a differential pressure of the fuel supplied to the centering grooves 46 from the inner flow passage (the through-hole) 42 through the communication ports 64. Accordingly, it is suppressed that the inner surface of the spool space (the valve sliding space) 39 and the sliding portions 44 of the spool valve 23 are always exposed to the wear-out at the same positions, and the wear resistance as well as durability of the electromagnetic valve 6 can be enhanced.

Fourth Embodiment

Figure 6:
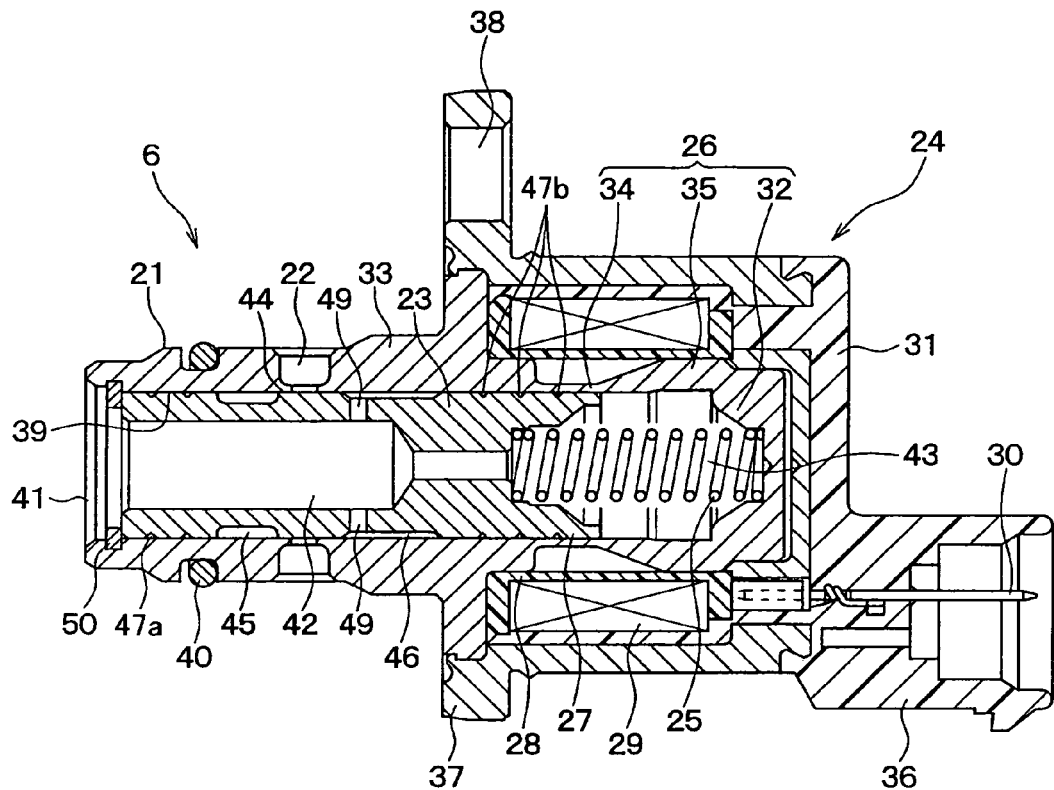
FIG. 6 is a cross sectional view of the flow control valve according to a fourth embodiment of the present invention.
Figure 7:
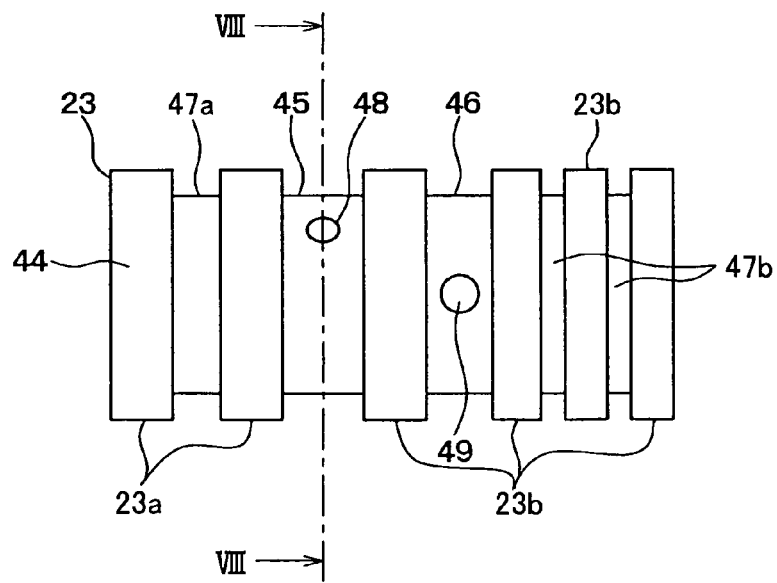
FIG. 7 is a schematic top plan view showing a spool valve of the flow control valve of FIG. 6.

A fourth embodiment will be explained with reference to FIGS. 6 to 8.

Figure 8:
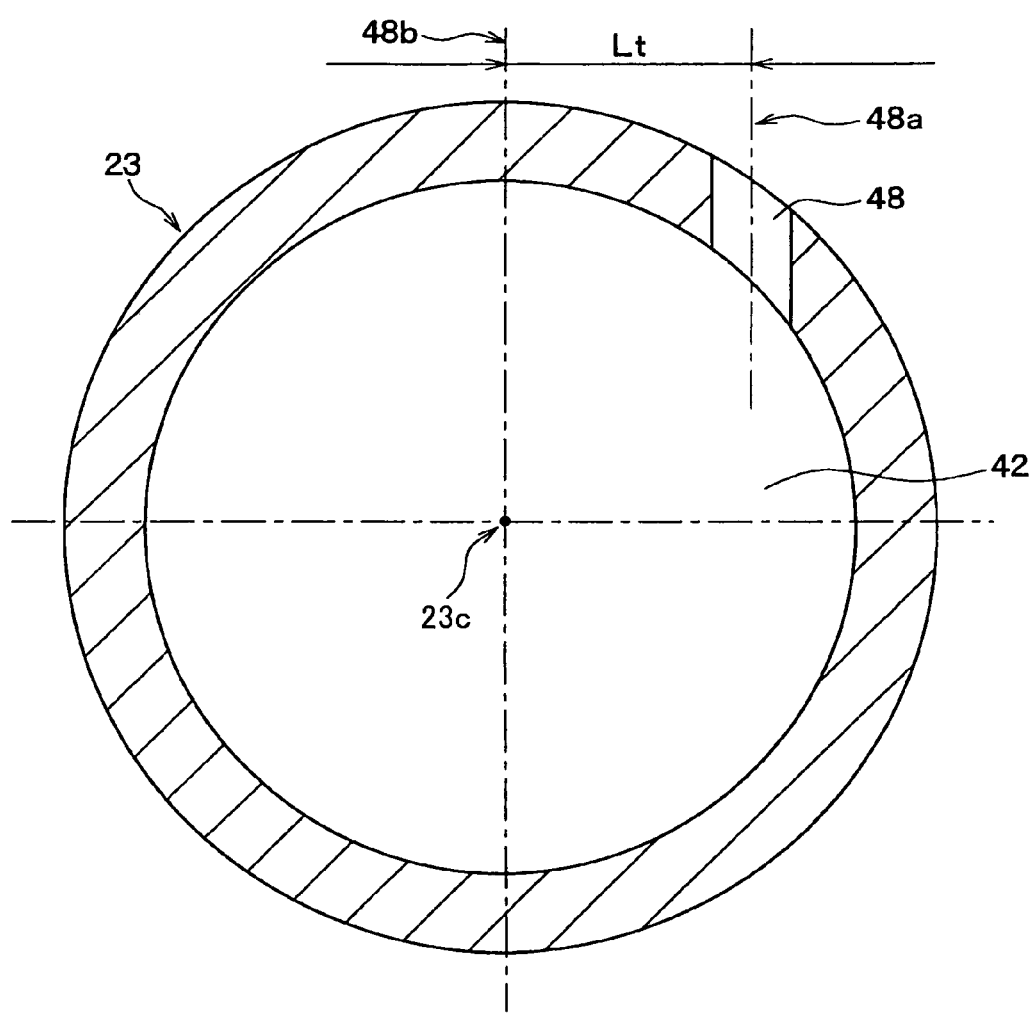
FIG. 8 is an enlarged cross sectional view taken along a line VIII-VIII of FIG. 7.

As shown in FIG. 8, the first communication port 48 extends in a direction perpendicular to an axial line 23a of the spool valve 23, and an axial line 48a of the first communication port 48 is displaced from the axial line 23a of the spool valve 23 when viewed in the direction of the axial line 23a of the spool valve 23. In other words, when a line 48b, which passes over the axial line 23a of the spool valve 23 and which is parallel to the axial line 48a of the communication port 48, is regarded as a reference line, the first communication port 48 is formed at a position offset from the reference line 48b by an offset amount "Lt" (hereinafter, referred to as a communication port offset amount). Although one communication port 48 is shown in the embodiment, multiple ports can be formed.

According to the above structure of the spool valve 23, a rotational force "Frot" (hereinafter, referred to as a spool valve rotational force) is generated at the spool valve 23 by the fuel flowing out of the first communication port 48, and the spool valve 23 is rotated in the spool space 39 around the axial line 23a. Accordingly, the contacting surface between the spool valve 23 and the valve casing 21 is changed, and it is suppressed that the inner surface of the spool space 39 and the outer surface of the sliding portions 44 of the spool valve 23 may wear out always at the same portions. The partial wear of the spool valve 23 and the valve casing 21 can be prevented, the wear of the spool valve 23 and the valve casing 21 can be decreased, and a bad operation of the spool valve 23 can be prevented. As a result, the increase of harmful exhaust gas, the deterioration of the drivability, the increase of engine noise and so on, which may be caused by the deterioration of controllability of fuel pressure in the common rail and a variation of fuel injection amount, can be suppressed.

Then, a design method in a hardware aspect is explained to generate the rotation of the spool valve 23 at a desired condition.

In this specification, a frictional force generated between the valve casing 21 and the spool valve 23 when the spool valve 23 is rotated is referred to as a rotational friction force "Ffr", a pressure at an upstream side of the first communication port 48 is referred to as an upstream pressure "Pfeed", a pressure at a downstream side of the first communication port 48 is referred to as a downstream pressure "Psuc", and a differential pressure is referred to as a pressure loss "Pfeed−Psuc".

Figure 9:
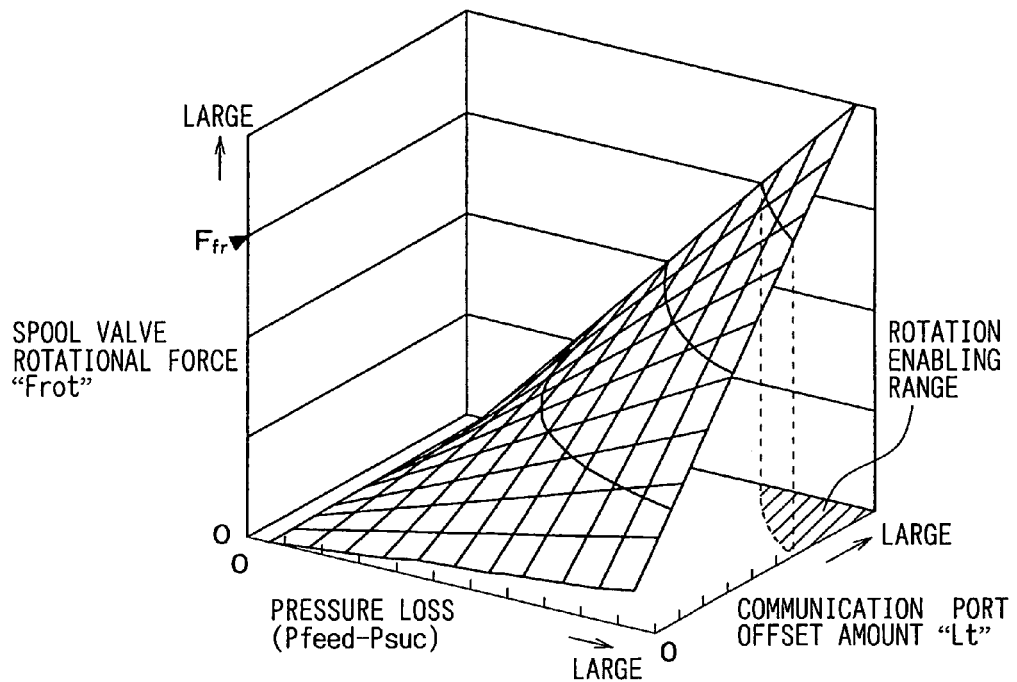
FIG. 9 is a graph showing a relation among a spool valve rotating force, a pressure loss at a communication port, and an offset amount of the communication port.

As shown in FIG. 9, the spool valve rotational force "Frot" becomes larger, as the pressure loss "Pfeed−Psuc" becomes larger, and the spool valve rotational force "Frot" becomes larger, as the communication port offset amount "Lt" becomes larger. Therefore, when the pressure loss "Pfeed−Psuc" and the communication port offset amount "Lt" are designed as such values, which are included in a rotation enabling range indicated by hatched lines, the spool valve rotational force "Frot" becomes larger than the rotational friction force "Ffr", so that the spool valve 23 can be rotated.

Figure 10:
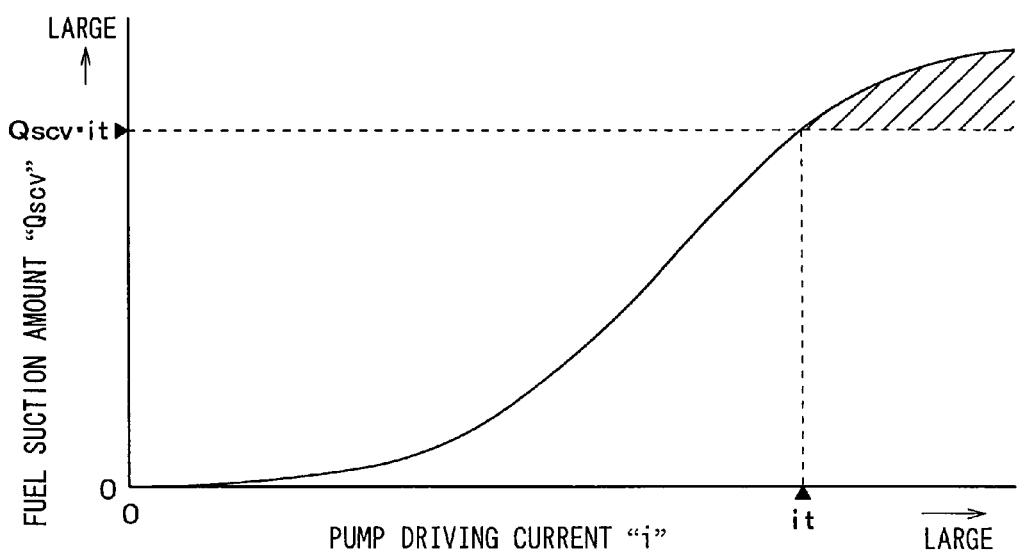
FIG. 10 is a graph showing a relation between a pump driving current and a fuel discharge amount.

Furthermore, as shown in FIG. 10, an amount "Qscv" of the fuel (hereinafter, referred to as fuel suction amount) fed into the pressurizing chamber through the suction flow control valve 6 is increased, as the pump driving current "i" is increased. A fuel suction amount, which is necessary for rotating the spool valve 23, is referred to as a rotation starting fuel suction amount "Qt", a fuel suction amount "Qscv", which is obtained when the pump driving current "i" is at its predetermined value "it", is referred to as a predetermined fuel suction amount "Qscv·it". In the case that "Qt=Qscv·it", the spool valve 23 can be rotated in a range of "Qt≧Qscv·it", namely in the range indicated by a hatched area in FIG. 10.

Figure 11:
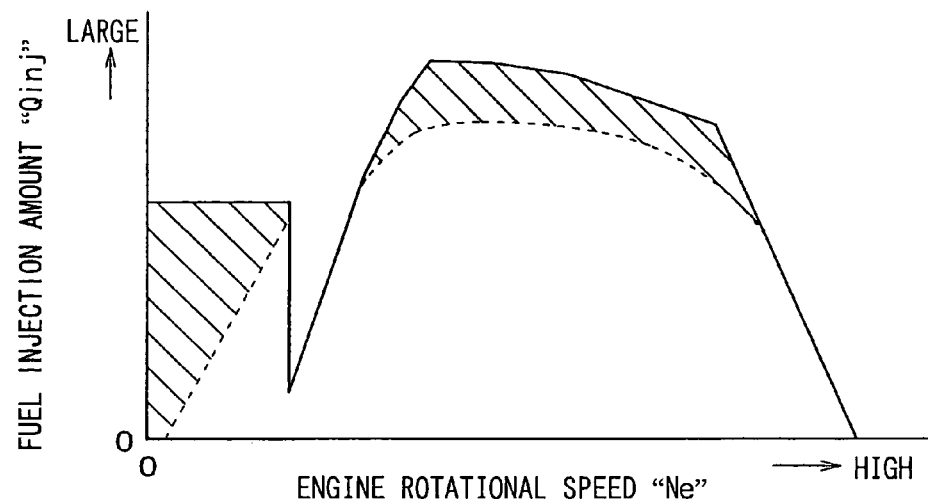
FIG. 11 is a graph showing a relation an engine rotational speed and a fuel injection amount.

An engine operational range, in which "Qt≧Qscv·it" is realized, corresponds to areas hatched in FIG. 11, namely an area of an engine starting period and an area of a high load operation. A vertical axis of FIG. 11 is an amount of the fuel to be injected into the combustion chambers of the respective engine cylinders, namely a fuel injection amount "Qinj", while a horizontal axis of FIG. 11 is the engine rotational speed "Ne".

When designing a hardware, the rotation starting fuel suction amount "Qt" is decided at first. The engine operational range, in which the spool valve 23 can be rotated, namely the hatched areas shown in FIG. 11 can be decided, by deciding the rotation starting fuel suction amount "Qt".

Then, a total passage area "St" of the first communication port 48 (hereinafter, referred to as a communication port total passage area), and the communication port offset amount "Lt" will be provisionally decided. In the case that the first communication port 48 comprises multiple ports, a sum of the passage areas of all communication ports 48 corresponds to the communication port total passage area "St".

Then, the spool valve rotational force "Frot" is calculated based on the provisionally decided communication port total passage area "St" and the communication port offset amount "Lt", etc. In the case that the calculated spool valve rotational force "Frot" is larger than the rotational friction force "Ffr", the fuel suction amount "Qscv" is calculated based on the provisionally decided communication port total passage area "St" and the pressure loss "Pfeed−Psuc", etc.

When the calculated fuel suction amount "Qscv" is larger than the initially decided rotation starting fuel suction amount "Qt", the spool valve 23 can be rotated. Therefore, the provisionally decided communication port total passage area "St" and the communication port offset amount "Lt" are defined as the final values.

On the other hand, when the calculated fuel suction amount "Qscv" is smaller than the initially decided rotation starting fuel suction amount "Qt", the spool valve 23 can not be rotated. Therefore, the calculation will be repeated until the calculated fuel suction amount "Qscv" becomes larger than the initially decided rotation starting fuel suction amount "Qt". More specifically, the fuel suction amount "Qscv" is made larger by increasing the communication port total passage area "St".

As a result of designing the hardware as above, the spool valve 23 can be surely rotated at the engine starting period and at the high load operation of the engine.

Now, an operational control for rotating the spool valve 23 at a desired range is explained. As described above, the spool valve 23 can be surely rotated at the engine starting period and at the high load operation of the engine. The operational control described below is to rotate the spool valve 23 when a certain condition is met at a range, other than the engine starting period and the high load operation of the engine.

Figure 12:
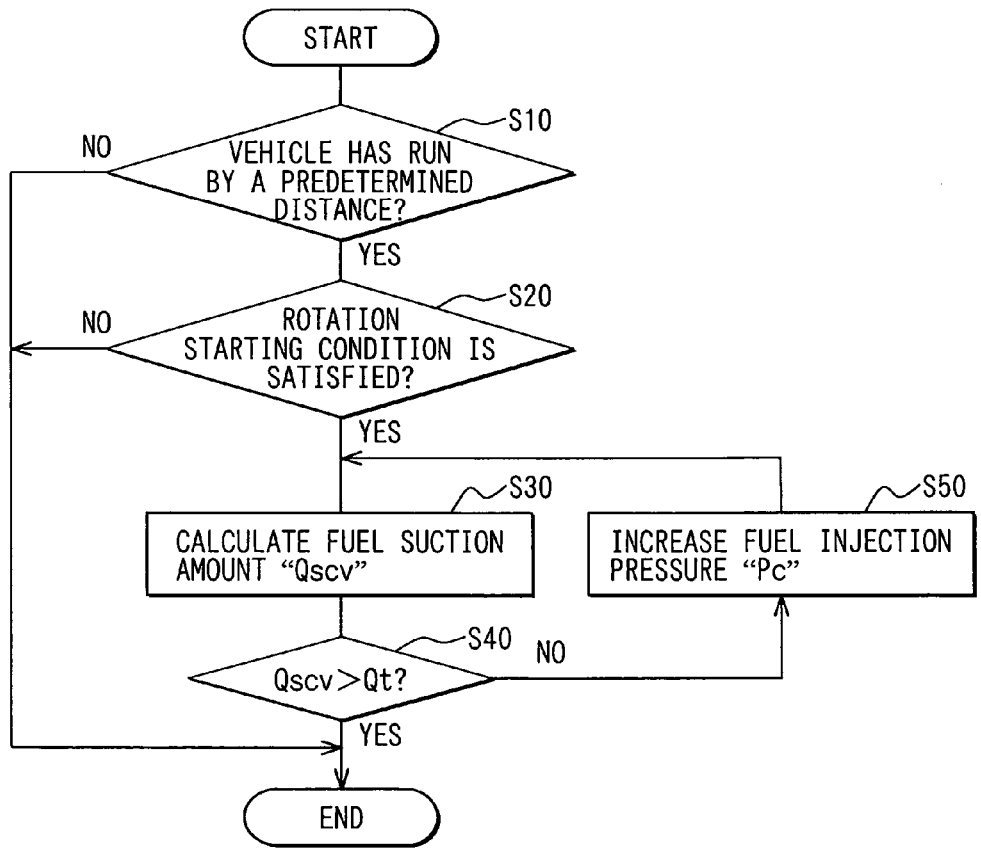
FIG. 12 is a flow chart for explaining the fourth embodiment.

FIG. 12 is a flow chart of a program performed by the CPU of the ECU 10. An operational control for rotating the spool valve 23 is carried out at steps A30 to S50, when a vehicle has run by a predetermined distance (YES at a step S10) after the operation of rotating the spool valve 23 had been carried out in the previous operation at which the certain condition had been met, and when a rotation starting condition is satisfied (YES at a step S20). The rotation starting condition is regarded as "satisfied", when both of the engine rotational speed "Ne" and the fuel injection amount "Qinj" are within predetermined ranges.

Then, the fuel suction amount "Qscv" is calculated (at the step S30). When the calculated fuel suction amount "Qscv" is smaller than the rotation starting fuel suction amount "Qt" (NO at the step S40), the spool valve 23 can not be rotated. Therefore, the fuel suction amount "Qscv" is increased by increasing the fuel injection pressure "Pc" (at the step S50). When the fuel injection pressure "Pc" is increased, an amount of leaked fuel from the injectors 3 as well as an amount of leaked fuel from the supply pump 5 is increased. The fuel suction amount "Qscv" is increased by the amount of increased leaked fuel, even when the fuel injection amount "Qinj" is the same.

After the fuel injection pressure "Pc" is increased at the step S50, the fuel suction amount "Qscv" is calculated again at the step S50, and the calculated fuel suction amount "Qscv" is compared with the rotation starting fuel suction amount "Qt" at the step S40. The steps S30 to S50 are repeated until the calculated fuel suction amount "Qscv" becomes larger than the rotation starting fuel suction amount "Qt".

According to the above operational control, the spool valve 23 can be surely rotated when the certain condition is met at the range, other than the engine starting period and the high load operation of the engine.

In the case that the certain condition is met, the fuel injection pressure "Pc" becomes higher and thereby a fuel injection ratio is increased. As a result, the engine noise may be increased. Accordingly, it is desirable to set, as the condition for starting the rotation at the step S20, the range of the engine rotational speed "Ne" and the fuel injection amount "Qinj" at such a range, in which the increase of the engine noise may not cause a problem.

Fifth Embodiment

A fifth embodiment will be explained with reference to FIGS. 13A, 13B, 14A and 14B.

Figure 13B:
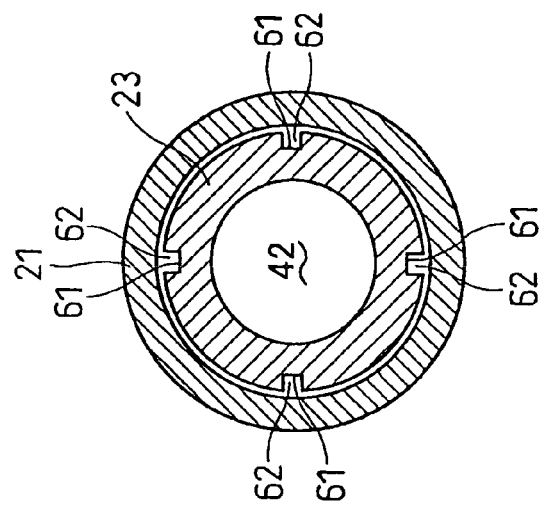
FIG. 13B is a cross sectional view taken along a line XIIIB-XIIIB of FIG. 13A.
Figure 13A:
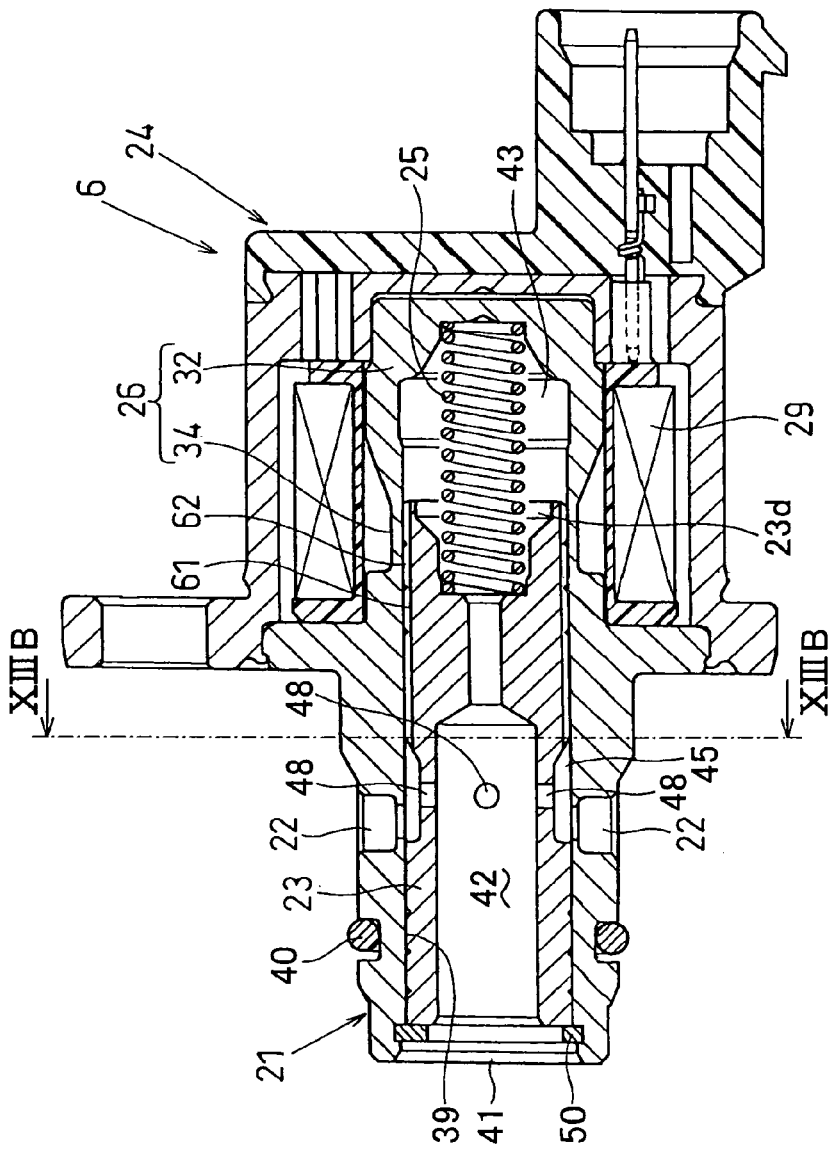
FIG. 13A is a cross sectional view of the flow control valve according to a fifth embodiment of the present invention.

The electromagnetic valve 6 comprises, as shown in FIG. 13A, the valve casing 21 of the sleeve shape fixed to the pump housing, the spool valve 23 for controlling the opening area of the fuel passage of the outlet port (the fluid port) 22 formed in the valve casing 21 and opening in the radial direction perpendicular to the axial direction of the valve casing, the linear solenoid actuator 24 for driving the spool valve 23 in the valve closing direction, and the return spring 25 for biasing the spool valve 23 in the valve opening direction.

As understood when comparing FIG. 13A (the fifth embodiment) with FIG. 2 (the first embodiment), the fifth embodiment differs from the first embodiment in that the electromagnetic valve 6 of FIG. 13A is the normally opened type valve, whereas the electromagnetic valve 6 of FIG. 2 is the normally closed type valve. Although the second circular groove (the centering groove) 46 and the second communication port 49 of the first embodiment are not provided in the fifth embodiment, they can be also formed in the electromagnetic valve of this fifth embodiment.

According to the electromagnetic valve 6 of the embodiment, multiple (four in the embodiment) longitudinal grooves (recesses) 61 are formed at the second sliding surface portions 23b of the spool valve 23, as shown in FIGS. 13A to 14B, wherein the longitudinal grooves 61 straightly extend in the axial direction of the spool valve 23. Accordingly, multiple (four in the embodiment) foreign material exhausting passages 62 are formed between the inner surface of the valve sliding space 39 of the valve casing 21 and the sliding portion of the spool valve 23, in order to exhaust the foreign materials or the wear-out powder from the fluid space (the inner space) 43 to the outside of the electromagnetic valve 6 through the communication ports 48 (or the flow amount adjusting groove 45) and the outlet ports 22.

The foreign material exhausting passages 62 are fluid passages, which straightly extend from the fluid space 43 toward the communication ports 48 (and the flow amount adjusting groove 45) in parallel to the axial line of the spool valve 23, which bypass the through-hole 42 formed in the inside of the spool valve 23, and which communicate the fluid space 43 with the communication ports 48 (or the flow amount adjusting groove 45). The multiple longitudinal grooves 61 are formed at the outer surface of the spool valve 23, at a predetermined interval (equal intervals; 90 degrees) of the circumferential direction of the spool valve 23. A depth of the longitudinal grooves 61 may be deeper than or shallower than, or equal to, that of the multiple circular oil grooves 47b. The multiple circular oil grooves 47a, 47b may be eliminated.

According to the above structure, the spool valve 23 of the present embodiment is moved within the valve sliding space 39 of the valve casing 21 in its axial direction, and the opening area of the outlet ports 22 of the valve casing 21, namely the overlapped area (the communication area) between the outlet ports 22 of the valve casing 21 and the communication ports 48 (or the flow amount adjusting groove 45) is changed, so that fuel flow amount (the fuel suction amount) to be fed into the two pressurizing chambers through the two suction valves can be controlled. A centering groove (46) can be formed at the sliding portion of the spool valve 23, as in the first embodiment.

Effects of the Embodiment

The fuel flows from the outside of the electromagnetic valve 6 into the through-hole 42 of the inside of the spool valve 23 through the inlet port 41 of the valve casing 21, then the fuel flows from the through-hole into the communication ports 48, and flows out of the electromagnetic valve 6 from the outlet ports 22. Accordingly, most of the fuel in the fluid space 43 communicated with the through-hole 42 may stay in the fluid space 43. Therefore, once the foreign materials having flown into the electromagnetic valve 6 along with the fuel, or the wear-out powder generated by the sliding movement between the sliding portion of the spool valve 23 and the sliding surface of the valve casing 21 flows into the fluid space 43, they may easily stay in the fluid space 43.

According to the electromagnetic valve 6 of the present embodiment, however, multiple longitudinal grooves 61 are formed at the outer peripheral surface of the spool valve 23, and multiple foreign material exhausting passages 62 are formed between the inner surface of the valve casing 21 and the outer surface of the spool valve 23. A differential pressure is generated between the fluid pressure at the side of the outlet ports and the communication ports and the fluid pressure in the spring space, when the electromagnetic valve 6 is opened, and the fluid flows through the through-hole 42 and the communication ports 48 of the spool valve 23, and the outlet ports 22 of the valve casing 21. Namely, since the fluid flow speed at the communication ports 48 and the outlet ports 22 is high, while the fluid flow speed of the fuel staying in the fluid space 43 is low, the fuel pressure in the fluid space 43 becomes higher than the fuel pressure at the outlet ports 22 or the communication ports 48. By use of such differential pressure, the foreign materials having flown into the fluid space 43 or the wear-out powder staying in the fluid space 43 are moved with the fuel to the communication ports 48 through the foreign material exhausting passages 62 and exhausted to the outside of the electromagnetic valve 6 through the outlet ports 22.

As the foreign materials and the wear-out powder can be actively exhausted from the inside to the outside of the electromagnetic valve 6, the problem to be caused by the foreign materials or the wear-out powder can be prevented. For example, the foreign materials or the wear-out powder can be prevented from breaking into the gap between the sliding surface of the spool valve 23 and the sliding surface of the valve sliding space 39. Furthermore, the foreign materials or the wear-out powder can be prevented from sticking to the sliding surface of the spool valve 23, to the sliding surface of the valve sliding space 39, or to both of them as bridging the gap between the sliding surfaces of the spool valve 23 and the valve sliding space 39. Accordingly, the bad sliding movement of the spool valve 23 can be prevented, because the sliding resistance of the spool valve 23 with respect to the valve casing 21 is decreased, and the sliding performance of the spool valve 23 is thereby improved. As a result, an increase of the engine output and improvement of the emission control can be achieved, because the control characteristic of the pump discharge amount can be optimized with respect to the pump driving current to be applied to the solenoid coil 29 of the electromagnetic valve 6.

Sixth Embodiment

FIG. 15 shows a sixth embodiment of the present invention, and is a view showing a spool valve of the electromagnetic valve to be assembled into the supply pump.

Multiple (four in the embodiment) communication passages 63 are formed in the inside of the spool valve 23, wherein the communication passages 63 straightly extend from the spring space 43 toward the communication ports 48 (or the flow amount adjusting groove 45) and the communication passages 63 are inclined against the axial line of the spool valve 23. The communication passages 63 function as the foreign material exhausting passages for exhausting the foreign materials or the wear-out powder from the spring space (fluid space) 43 to the outside of the electromagnetic valve 6 by use of the differential pressure. Accordingly, the present embodiment has the same effect to the fifth embodiment.

The outlet port 22 can be used as the inlet port, whereas the inlet port 41 is used as the outlet port. And the fuel pooling portion, into which the fuel is supplied from the feed pump, can be formed at an upstream side of the inlet port, and the latter half of the suction passage line communicating with the pressurizing chambers through the suction valves can be provided at a downstream side of the outlet port. The pump driving signal of pulse shape to be outputted to the pump driving circuit as well as the pump driving current to be applied to the solenoid coil 29 of the electromagnetic valve 6 can be feedback controlled based on a PID control (or a PI control), in order that the common rail pressure (PC) detected by the fuel pressure sensor 55 may reach at the target common rail pressure (the target fuel pressure: PFIN), which is determined in accordance with the operational condition of the engine (for example, the engine rotational speed (NE), the command fuel injection amount (Q), and so on). A control accuracy of the fuel injection amount can be thereby increased.

The pump driving signal of the pulse shape is preferably controlled by a duty control (DUTY). Namely, a ratio of ON and OFF of the pump driving signal (a current supply ratio: a duty ratio) for a unit time is adjusted based on a differential pressure (ΔP) between the common rail pressure (PC) and the target common rail pressure (PFIN), so that an average current value of the pump driving current to be applied to the solenoid coil 29 of the electromagnetic valve 6 is controlled. The change of the opening area of the flow passage at the outlet port 22 is thereby controlled by the duty control. With such control, a digital control of a high accuracy can be possible, and a control response (a pressure control response), a follow-up control performance as well as pressure stability can be improved with respect to the common rail pressure (PC) against the target common rail pressure (PFIN). The command fuel injection amount (Q) can be obtained based on a base amount of the fuel injection decided by the engine rotational speed (NE) and the acceleration opening degree (ACCP), wherein the base amount is corrected by a correction amount which is calculated from the engine cooling water temperature (THW), the fuel temperature and so on. The command fuel injection amount (Q) can be obtained based on a driver demand torque calculated from a pedal stroke of the vehicle driver.

According to the above embodiments, the supply pump 5 is used, wherein the pump has two plungers and pressurizing chambers, which are arranged at a diametrical direction to a rotational center axis (an axial direction) of the pump driving shaft (the cam shaft or the drive shaft), or the supply pump 5 is used, wherein the pump has more than three plungers and pressurizing chambers, which are arranged at equal intervals in the circumferential direction of the pump driving shaft (the cam shaft or the drive shaft). However, such a supply pump (a high pressure supply pump) can be used, wherein the pump has multiple plungers arranged at predetermined intervals (for example, equal intervals) in a direction of a rotational center axis (an axial direction) of the pump driving shaft (the cam shaft or the drive shaft). Furthermore, the valve casing 21 commonly has the cylinder function and the stator function. However, a stator core having only the stator function can be assembled to the valve casing 21 having only the cylinder function. Furthermore, the electromagnetic valve may be used as the electromagnetic valve 4 of the injector 3, or as an electromagnetic flow amount control valve for controlling the flow amount of liquid, such as oils of other lubricating oil, working oil, water, and so on, or the flow amount of gas, such as air, exhaust gas, re-circulated exhaust gas, and so on.

Furthermore, an electric type flow control valve, which is driven by an electric motor to open or close its valve, can be used instead of the electromagnetic valve. The present invention can be applied to a fluid passage switching valve, or a fluid passage opening-closing valve.

According to the above fifth embodiment, the multiple longitudinal grooves (the recesses) 61 are formed at the outer peripheral surface of the spool valve 23, and thereby the multiple foreign material exhausting passages 62 are formed between the inner surface of the valve sliding space 39 and the outer surface of the spool valve 23. However, multiple longitudinal grooves (recesses) can be formed at the inner surface of the valve sliding space 39 of the valve casing 21, and thereby multiple foreign material exhausting passages may be formed between the inner surface of the valve sliding space 39 and the outer surface of the spool valve 23.

Furthermore, multiple longitudinal grooves (recesses) can be formed at both of the inner surface of the valve sliding space 39 and the outer surface of spool valve 23, to form the multiple foreign material exhausting passages between the inner surface of the valve sliding space 39 and the outer surface of spool valve 23. The number of the longitudinal grooves (recesses) 61 and the number of the foreign material exhausting passages 62 can be respectively one, two or three, or more than five. Furthermore, the foreign material exhausting passages 62 can be formed as being slightly curved as an arc from the spring space 43 to the communication ports 48 (and the flow amount adjusting groove 45).

According to the sixth embodiment, the multiple communication passages 63 are formed in the inside of the spool valve 23, and the communication passages 63 are used as the foreign material exhausting passages. However, multiple communication passages can be formed in the inside of the valve casing 21, and such communication passages can be used as the foreign material exhausting passages. The number of the communication passages (the foreign material exhausting passages) can be one, two or three, or more than five. Furthermore, the communication passages 63 can be formed as being slightly curved as an arc from the spring space 43 to the communication ports 48 (and the flow amount adjusting groove 45).

What is claimed is:

1. A flow control valve comprising:
   a valve casing having a cylindrical body portion and a closed end portion, a valve sliding space being formed in the cylindrical body portion, one end of the valve sliding space forming a first fluid port and the other end of the valve sliding space being closed by the closed end portion, a second fluid port being formed in the cylindrical body portion and extending in a radial direction perpendicular to an axial line of the valve casing;
   a spool valve movably supported in the valve sliding space of the valve casing and movable in an axial direction of the valve casing, a through-hole being formed in the spool valve for communicating both of first and second axial ends of the spool valve with each other, a first communication port being formed in the spool valve for communicating the through-hole with an outside of the spool valve, the first communication port being operatively communicated with the second fluid port of the valve casing when the spool valve is moved in the axial direction, and an outer surface of the spool valve being substantially fluid-tightly in a sliding contact with an inner surface of the valve sliding space of the valve casing;
   a fluid space formed in the valve sliding space and defined by the closed end portion and the spool valve, the fluid space being communicated with the through-hole of the spool valve; and
   a spring disposed in the fluid space for biasing the spool valve in an axial direction of the spool valve,
   wherein:
   a first circular groove is formed at the outer surface of the spool valve communicated with the first communication port, so that the first communication port is operatively communicated with the second fluid port through the first circular groove, wherein an opening area of the second fluid port is changed depending on a relative position of the spool valve with respect to the valve casing in order that a flow amount of the fluid flowing through the second fluid port is controlled;
   a first and second sliding surface portions are formed by the outer surface at both axial sides of the first circular groove;
   multiple circular oil grooves are formed at the first and second sliding surface portions, wherein the fluid flows into the multiple circular oil grooves so that the spool valve is smoothly moved in the axial direction within the valve sliding space;
   a second circular groove is formed at the outer surface of the spool valve between the first circular groove and the second sliding surface portion of the spool valve;
   a circular seal portion is formed on the outer surface of the spool valve between the first and second circular grooves, so that the first and second circular grooves are fluid tightly sealed from each other; and
   a second communication port is formed in the spool valve for communicating the through-hole with the second circular groove, so that high pressure fluid is supplied from the through-hole to the second circular groove through the second communication port to carry out a centering of the spool valve within the valve sliding space, wherein a width of the second circular groove in a longitudinal direction of the spool valve is greater than a diameter of the second communication port.

2. A flow control valve according to claim 1, wherein the width of the second circular groove is greater than a width of the first circular groove in the longitudinal direction of the spool valve.

3. A flow control valve according to claim 1, wherein the width of the second circular groove in the longitudinal direction of the spool valve is greater than a width of the first circular groove.

4. A flow control valve comprising:

a valve casing having a cylindrical body portion and a closed end portion, a valve sliding space being formed in the cylindrical body portion, one end of the valve sliding space forming a first fluid port and the other end of the valve sliding space being closed by the closed end portion, a second fluid port being formed in the cylindrical body portion and extending in a radial direction perpendicular to an axial line of the valve casing;

a spool valve movably supported in the valve sliding space of the valve casing and movable in an axial direction of the valve casing, a through-hole being formed in the spool valve for communicating both of first and second axial ends of the spool valve with each other, a first communication port being formed in the spool valve for communicating the through-hole with an outside of the spool valve, the first communication port being operatively communicated with the second fluid port of the valve casing when the spool valve is moved in the axial direction, and an outer surface of the spool valve being substantially fluid-tightly in a sliding contact with an inner surface of the valve sliding space of the valve casing;

a fluid space formed in the valve sliding space and defined by the closed end portion and the spool valve, the fluid space being communicated with the through-hole of the spool valve; and a spring disposed in the fluid space for biasing the spool valve in an axial direction of the spool valve, wherein:

a first circular groove is formed at the outer surface of the spool valve communicated with the first communication port, so that the first communication port is operatively communicated with the second fluid port through the first circular groove, wherein an opening area of the second fluid port is changed depending on a relative position of the spool valve with respect to the valve casing in order that a flow amount of the fluid flowing through the second fluid port is controlled;

a first and second sliding surface portions are formed by the outer surface at both axial sides of the first circular groove;

multiple circular oil grooves are formed at the first and second sliding surface portions, wherein the fluid flows into the multiple circular oil grooves so that the spool valve is smoothly moved in the axial direction within the valve sliding space;

a second circular groove is formed at the outer surface of the spool valve between the first circular groove and the second sliding surface portion of the spool valve;

a first longitudinal groove is formed on the first sliding surface portion, extending in the axial direction of the spool valve from the first axial end to a first circular oil groove, so that high pressure fluid flows into the first circular oil groove; and a second longitudinal groove is formed on the second sliding surface portion, extending in the axial direction of the spool valve from the second axial end to a second circular oil groove, so that high pressure fluid flows into the second circular oil groove.

5. A flow control valve comprising:

a valve casing having a cylindrical body portion and a closed end portion, a valve sliding space being formed in the cylindrical body portion, one end of the valve sliding space forming a first fluid port and the other end of the valve sliding space being closed by the closed end portion, a second fluid port being formed in the cylindrical body portion and extending in a radial direction perpendicular to an axial line of the valve casing;

a spool valve movably supported in the valve sliding space of the valve casing and movable in an axial direction of the valve casing, a through-hole being formed in the spool valve for communicating both of first and second axial ends of the spool valve with each other, a first communication port being formed in the spool valve for communicating the through-hole with an outside of the spool valve, the first communication port being operatively communicated with the second fluid port of the valve casing when the spool valve is moved in the axial direction, and an outer surface of the spool valve being substantially fluid-tightly in a sliding contact with an inner surface of the valve sliding space of the valve casing;

a fluid space formed in the valve sliding space and defined by the closed end portion and the spool valve, the fluid space being communicated with the through-hole of the spool valve; and a spring disposed in the fluid space for biasing the spool valve in an axial direction of the spool valve, wherein:

a first circular groove is formed at the outer surface of the spool valve communicated with the first communication port, so that the first communication port is operatively communicated with the second fluid port through the first circular groove, wherein an opening area of the second fluid port is changed depending on a relative position of the spool valve with respect to the valve casing in order that a flow amount of the fluid flowing through the second fluid port is controlled;

a first and second sliding surface portions are formed by the outer surface at both axial sides of the first circular groove;

multiple circular oil grooves are formed at the first and second sliding surface portions, wherein the fluid flows into the multiple circular oil grooves so that the spool valve is smoothly moved in the axial direction within the valve sliding space;

a second circular groove is formed at the outer surface of the spool valve between the first circular groove and the second sliding surface portion of the spool valve; and a longitudinal groove is formed on the second sliding surface portion, extending in the axial direction of the spool valve from the second axial end to the second circular oil groove, so that high pressure fluid flows into the second circular oil groove.

6. A flow control valve comprising:

a valve casing having a cylindrical body portion and a closed end portion, a valve sliding space being formed in the cylindrical body portion, one end of the valve sliding space forming a first fluid port and the other end of the valve sliding space being closed by the closed end portion, a second fluid port being formed in the cylindrical body portion and extending in a radial direction perpendicular to an axial line of the valve casing;

a spool valve movably supported in the valve sliding space of the valve casing and movable in an axial direction of the valve casing, a through-hole being formed in the spool valve for communicating both of first and second axial ends of the spool valve with each other, a first communication port being formed in the spool valve for communicating the through-hole with an outside of the spool valve, the first communication port being operatively communicated with the second fluid port of the valve casing when the spool valve is moved in the axial direction, and an outer surface of the spool valve being substantially fluid-tightly in a sliding contact with an inner surface of the valve sliding space of the valve casing;

a fluid space formed in the valve sliding space and defined by the closed end portion and the spool valve, the fluid space being communicated with the through-hole of the spool valve; and a spring disposed in the fluid space for biasing the spool valve in an axial direction of the spool valve, wherein:

a first circular groove is formed at the outer surface of the spool valve communicated with the first communication port, so that the first communication port is operatively communicated with the second fluid port through the first circular groove, wherein an opening area of the second fluid port is changed depending on a relative position of the spool valve with respect to the valve casing in order that a flow amount of the fluid flowing through the second fluid port is controlled;

a first and second sliding surface portions are formed by the outer surface at both axial sides of the first circular groove;

multiple circular oil grooves are formed at the first and second sliding surface portions, wherein the fluid flows into the multiple circular oil grooves so that the spool valve is smoothly moved in the axial direction within the valve sliding space;

a second circular groove is formed at the outer surface of the spool valve between the first circular groove and the second sliding surface portion of the spool valve; and a longitudinal groove is formed on the second sliding surface portion, extending in the axial direction of the spool valve from the second axial end to the second circular groove, so that high pressure fluid flows from the fluid space into the second circular groove through the longitudinal groove to carry out a centering of the spool valve within the valve sliding space.

* * * * *